US012235173B2

(12) United States Patent
Nguyen et al.

(10) Patent No.: US 12,235,173 B2
(45) Date of Patent: Feb. 25, 2025

(54) ELECTRICAL STIFFNESS-BASED SENSOR

(71) Applicant: THE REGENTS OF THE UNIVERSITY OF CALIFORNIA, Oakland, CA (US)

(72) Inventors: Clark T.-C. Nguyen, Oakland, CA (US); Alper Ozgurluk, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 508 days.

(21) Appl. No.: 17/537,851

(22) Filed: Nov. 30, 2021

(65) Prior Publication Data

US 2022/0163413 A1   May 26, 2022

Related U.S. Application Data

(63) Continuation of application No. PCT/US2020/036517, filed on Jun. 6, 2020.

(60) Provisional application No. 62/858,720, filed on Jun. 7, 2019.

(51) Int. Cl.
*G01L 1/14* (2006.01)

(52) U.S. Cl.
CPC .................... *G01L 1/142* (2013.01)

(58) Field of Classification Search
CPC ...... G01L 1/142; G01P 15/097; G01P 15/125; G01C 19/5684
See application file for complete search history.

(56) References Cited

U.S. PATENT DOCUMENTS

| 5,447,601 | A | * | 9/1995 | Norris | G01C 19/5684 216/75 |
| 5,574,221 | A | | 11/1996 | Park | |
| 6,651,481 | B1 | | 11/2003 | Youngquist | |
| (Continued) | | | | | |

FOREIGN PATENT DOCUMENTS

| EP | 0391217 A2 * | 10/1990 |
| WO | 2020247891 | 12/2020 |

OTHER PUBLICATIONS

ISA/US, United States Patent and Trademark Office (USPTO), International Search Report and Written Opinion issued Oct. 15, 2020, related PCT international application No. PCT/US2020/036517, pp. 1-15, with claims searched, pp. 16-21.

*Primary Examiner* — Octavia Hollington
(74) *Attorney, Agent, or Firm* — O'BANION & RITCHEY LLP; John P. O'Banion

(57) ABSTRACT

An on-chip strain measurement device that uses precision frequency measurements to precisely extract sub-nm displacements, allowing residual strain measurements in a given structural film. Strain-induced gap changes to resonance frequencies use differential strategies to remove bias uncertainty, allowing measurement of sub-nm displacements. Gap-dependent electrical stiffness is used to shift resonance frequencies as structural elements stretch or shrink to relieve strain. An output based on differential frequencies between two proximal structures with unequal stress arm lengths removes uncertainty on the initial gap spacing. The ability to precisely measure the frequency of the high-Q structures allows lifetime stress correction of micromechanical circuits, such as oscillators and filters.

20 Claims, 12 Drawing Sheets

(56) References Cited

U.S. PATENT DOCUMENTS

| | | | | |
|---|---|---|---|---|
| 7,551,043 B2* | 6/2009 | Nguyen | ............... | H03H 3/0072 |
| | | | | 333/186 |
| 8,189,300 B1* | 5/2012 | Bonin | ................... | G01D 5/2417 |
| | | | | 360/290 |
| 8,347,718 B2* | 1/2013 | Malvern | ............ | G01C 19/5677 |
| | | | | 73/504.12 |
| 8,555,718 B2* | 10/2013 | Kuang | ............... | G01C 19/5677 |
| | | | | 73/504.13 |
| 8,952,891 B2* | 2/2015 | Tanbakuchi | ........... | B82Y 35/00 |
| | | | | 345/173 |
| 10,224,875 B2* | 3/2019 | Nguyen | .................... | H03H 9/25 |
| 10,530,337 B2* | 1/2020 | Nguyen | ............... | H03H 9/2426 |
| 10,879,869 B2* | 12/2020 | Elsayad | ............... | H03H 3/0072 |
| 2006/0213287 A1 | 9/2006 | Sakano | | |
| 2006/0220655 A1 | 10/2006 | Hoyte | | |
| 2010/0212424 A1 | 8/2010 | Malvern | | |
| 2013/0094029 A1 | 4/2013 | Bienstman | | |
| 2014/0361843 A1 | 12/2014 | Quevy | | |

\* cited by examiner

ELECTRICAL STIFFNESS-BASED SENSOR

CROSS-REFERENCE TO RELATED APPLICATIONS

This application claims priority to, and is a 35 U.S.C. § 111(a) continuation of, PCT international application number PCT/US2020/036517 filed on Jun. 6, 2020, incorporated herein by reference in its entirety, which claims priority to, and the benefit of, U.S. provisional patent application Ser. No. 62/858,720 filed on Jun. 7, 2019, incorporated herein by reference in its entirety. Priority is claimed to each of the foregoing applications.

The above-referenced PCT international application was published as PCT International Publication No. WO 2020/0247891 A1 on Dec. 10, 2020, which publication is incorporated herein by reference in its entirety.

This application claims priority to, and the benefit of, U.S. provisional patent application Ser. No. 62/858,720 filed on Jun. 7, 2019 incorporated herein by reference in its entirety.

STATEMENT REGARDING FEDERALLY SPONSORED RESEARCH OR DEVELOPMENT

This invention was made with Government support under Grant No. HR0011-15-2-0052 awarded by the Defense Advanced Research Projects Agency, and under Grant No. 1809319 awarded by the National Science Foundation. The Government has certain rights in the invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to gap measurement and more particularly to gap measurement as a way to precisely measure strain in a given system using microelectromechanical systems (MEMS).

2. Background Discussion

Strains are important in the development of MEMS devices. As these devices shrink in size, increasingly accurate strain measurements are required. This work addresses extremely accurate strain measurement.

Recently demonstrated sub-20 nm capacitive-gap transduced resonators with Cx/Co's of 71% at 10-MHz and 1.62% at 60-MHz now introduce compelling combinations of high Q and strong electromechanical coupling at high frequency (HF) and very high frequency (VHF) that could change the landscape of applications available to MEMS. However, small electrode-to-resonator gaps also make more difficult the design and realization of MEMS-based mechanical circuits, e.g., filters and oscillator arrays, that become more prone to post-fabrication residual stress as circuit size and gap spacing increase and decrease, respectively. Although recent design and fabrication efforts have substantially improved yields, a strain sensor able to precisely measure residual stress in close proximity to a device would permit real-time correction for strain-induced shifts, as well as optimization of the process recipes used to fabricate small-gap devices.

BRIEF SUMMARY

Residual strains inherent in microelectromechanical systems (MEMS) devices may affect device operation, or be used directly to measure length changes. Here, it is shown how length changes below 1 nm may be measured by a ring or a pair of beam resonators.

By way of example, and not of limitation, this disclosure describes an on-chip strain measurement device uses precision frequency measurements to precisely extract sub-nm displacements, allowing residual strain measurements in a given structural film, where stresses as small as 15 MPa correspond to 2.9 nm of displacement. Strain-induced gap changes to resonance frequencies use differential strategies to remove bias uncertainty, allowing measurement of sub-nm displacements that equate to sub-$\mu\varepsilon$ increments. Gap-dependent electrical stiffness is used to shift resonance frequencies as structural elements stretch or shrink to relieve strain. An output based on differential frequencies between two proximal structures with unequal stress arm lengths removes uncertainty on the initial gap spacing, permitting a 210 Hz/$\mu\varepsilon$ scale factor. The ability to precisely measure the frequency of the high-Q (~4000) structures, down to at least 1 Hz, puts the resolution of this sensor at least 5 n$\varepsilon$ (or 790 Pa for polysilicon), and allows lifetime stress correction of micromechanical circuits, such as oscillators and filters.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

This disclosure describes using electrical stiffness as a sensing parameter. While the description herein specifically focuses on strain sensors, it should be understood that there are many other sensor mode embodiments, e.g., temperature sensor, pressure sensor, etc., to which the technology can be applied. In one embodiment, an electrical stiffness-based sensor generates a resonance frequency shift when the sensed variable induces a change in gap spacing between an electrode and a resonant structure. The utility of such a sensor increases as one makes the starting gap spacing smaller.

The technology presented in this disclosure has been reduced to practice using both ring-based and beam-based micromechanical structures. In particular, an on-chip strain measurement device was demonstrated that harnesses precision frequency measurement to precisely extract sub-nm displacements, allowing it to determine the residual strain in a given structural film with best-in-class accuracy, where a stress as small as 15 MPa corresponds to 2.9 nm of displacement.

The demonstration specifically harnesses a spoke-supported ring structure surrounded both inside and outside by balanced capacitive-gap transducers that pull the ring structure resonance frequency according to strain-induced changes in inside and outside electrode-to-structure gap spacings. The use of a ring structure with balanced electrodes further eliminates uncertainty in the initial fabrication gap spacing, which in turn enhances accuracy. The importance of attaining such accuracy manifests in the fact that knowledge of residual strain might be the single most important constraint on the complexity of large mechanical circuits, such as mechanical filters, and the ultimate stability of MEMS-based oscillators.

Potential applications of the technology include, but are not limited to, the following:

1. Filters for RF channel-selection that can enable practical software-defined cognitive radio.

2. Ultra-low noise oscillators for timing, radar, navigation, and communications, where an electrical stiffness-based strain sensor could greatly improve frequency stability against stress relaxation, e.g., from the package.

3. Gyroscopes, accelerometers, and inertial measurement units that employ resonating elements, such as MEMS-based gyroscopes used in automobiles, cell phones, and gaming wands, e.g., the Wii.

4. Sensors that employ elements that can vibrate, including the aforementioned inertial measurement units, but also sensors for gas, temperature, pressure, motion, stress, and just about everything that would need to be sensed. (Resonant sensors are widely recognized as the most sensitive available).

5. Any application that can benefit from a highly accurate sensor.

Example A

Figure 1A:
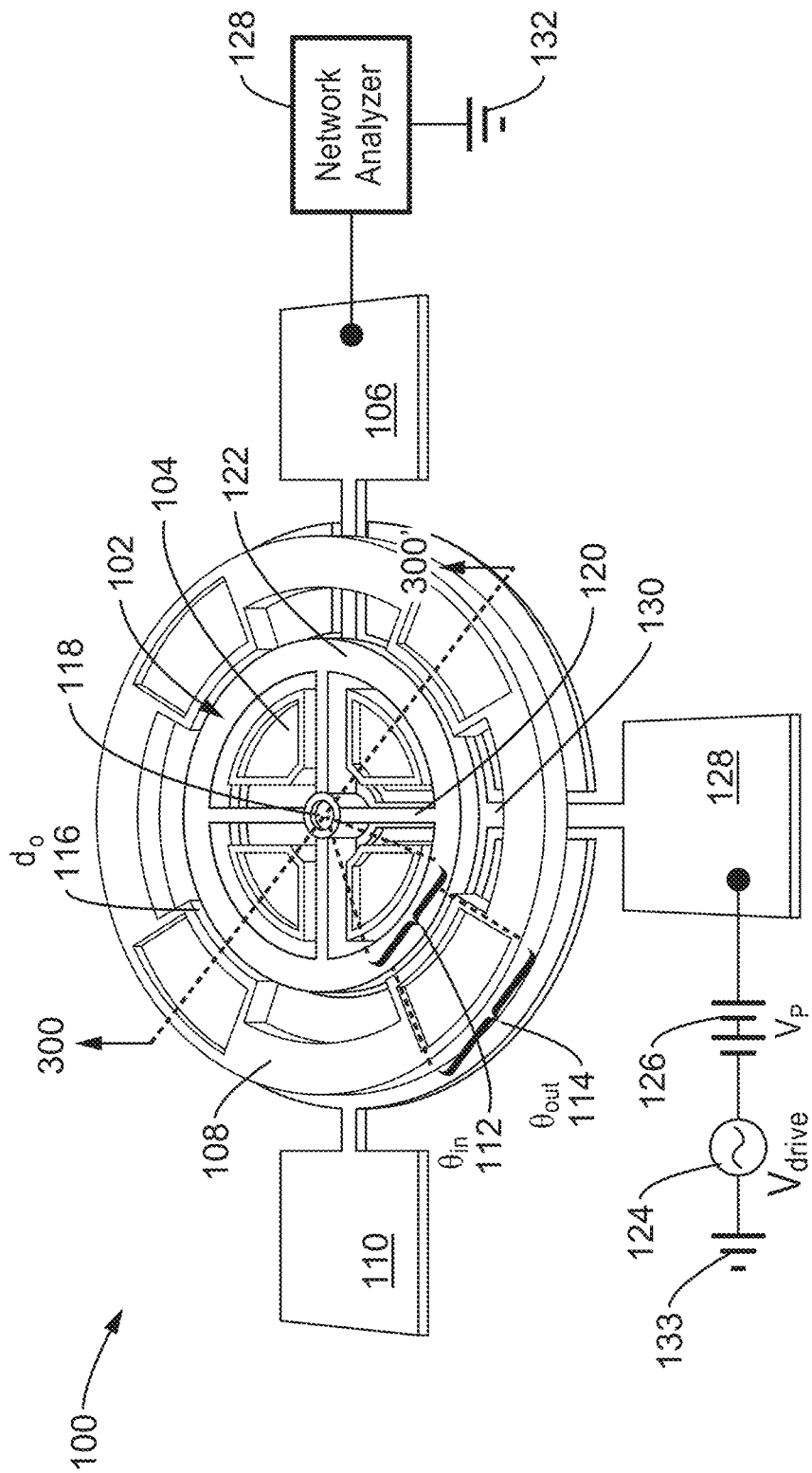
FIG. 1A is a perspective view of the ring-based strain sensor described herein in a typical operating circuit with dimensions given in Table 1.

On-Chip Precision Residual Strain Diagnostic Based on Gap-Dependent Electrical Stiffness An on-chip strain measurement device is demonstrated here that harnesses precision frequency measurements to precisely extract sub-nm displacements, allowing it to determine the residual strain in a given structural film with best-in-class accuracy, where a stress as small as 15 MPa corresponds to 2.9 nm of displacement Referring now to FIG. 1A, a device 100 specifically harnesses a spoke supported ring resonator 102 structure surrounded with an inside capacitive-gap transducer 104 electrically connected to an inside sense electrode 106, and with an outside balanced capacitive-gap transducer 108 electrically connected to an outside sense electrode 110 that pulls the ring resonator 102 resonance frequency according to strain-induced changes in inside and outside capacitive-gap transducer to resonator 102 structure gap spacing.

The inside capacitive-gap transducer 104 subtends an arc $\theta_{in}$ 112 inside the resonator 102. Here, there are four such inside arcs shown.

The outside capacitive-gap transducer 108 subtends an arc $\theta_{out}$ 114 in the outside radius of the resonator 102. Here, there are four outside arcs shown.

It should be noted that the transduction area of the inside capacitive-gap transducer 104 may be the same as the transduction area of the outside capacitive-gap transducer 108; however, it is not necessary that these inside and outside transduction areas be equal. When these areas are the same, the term "balanced" capacitive-gap transducer is used. The overlap of these two capacitive-gap transduction areas is termed $A_{ov}$.

A gap $d_0$ 116 is formed between the ring resonator 102 structure and the outside capacitive-gap transducer 108.

The resonator 102 is supported by a support stem 118 connecting to support spokes 120 that in turn connect to the ring 122 of the ring resonator 102 structure.

Driving of the ring resonator 102 structure is accomplished by applying a waveform $V_{drive}$ 124 with a DC-bias voltage $V_p$ 126 to a drive electrode 128 that electrically connects to the support stem 118 that projects above a substrate 130, and ultimately to the resonator 102. The combination of the $V_{drive}$ 124 with the DC offset voltage $V_p$ 126 across a resonator-to-electrode gap (e.g. gap $d_0$ 116) generates a force at the frequency of $V_{drive}$ between the ring 122 and electrode that causes oscillation of the resonator 102 at the frequency of $V_{drive}$. If $V_{drive}$ is at the resonance frequency, then the resonator vibration amplitude is amplified by a factor of Q times.

The input of an output detection device (e.g., the analyzer 128 shown in FIG. 1A) electrically connects to the inside sense electrode 106 and sets the voltage of the electrode, thereby ensuring a well-defined voltage across a given resonator-to-electrode gap. It is understood that the analyzer 128 is connected to a ground 132 common to the waveform $V_{drive}$ 124. Analyzer 128 can be, for example, one or more of a network analyzer, one or more of a spectrum analyzer, or one or more of a frequency counter.

FIG. 1A depicts the case where inside sense electrode 106 output pad electrically connects to the inside electrode 104, so the analyzer 128 measures the output current from the inside electrode 104. One can also connect the analyzer 128 to outside sense electrode 110 which connects to outside balanced capacitive-gap transducer 108, in which case it measures the output current from the outside balanced capacitive-gap transducer 108.

Figure 1B:
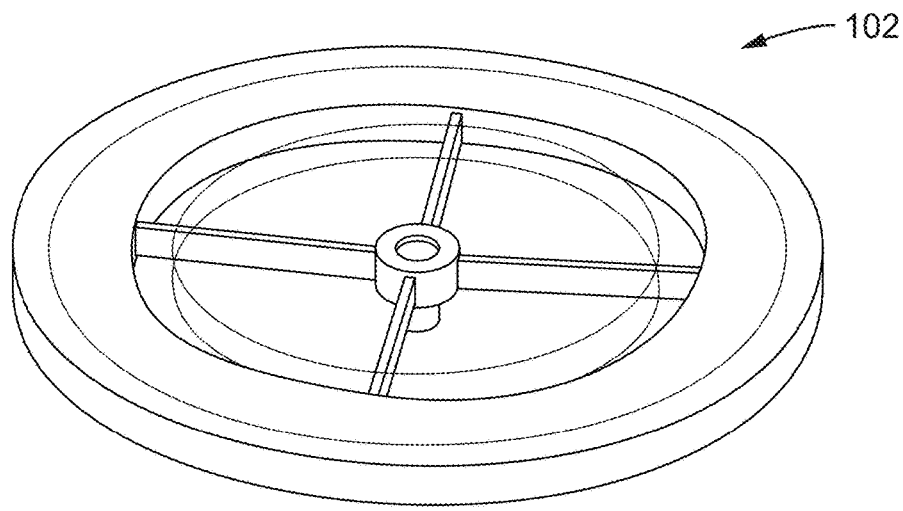
FIG. 1B is a view of the finite element analysis (FEA) simulated mode shape of the resonator of FIG. 1A.

Refer now to FIGS. 1A and 1B. FIG. 1B is a finite element analysis of the modal vibrational characteristics of the ring resonator 102 of FIG. 1A.

The use of a ring resonator 102 structure with balanced inside and outside transducers (respectively 104 and 108) further eliminates uncertainty in the gap $d_0$ 116 spacing, which in turn enhances device accuracy. The importance of attaining such accuracy manifests in the fact that knowledge of residual strain might be the single most important constraint on the complexity of large mechanical circuits, such as mechanical filters.

Recent demonstrations of sub-20 nm electrode-to-resonator gaps have permitted capacitive-gap transducer electromechanical coupling strengths well past those posted by alternatives in the high (HF) to very high frequency (VHF) range, with Cx/Co's up to 71% at 10-MHz and 1.62% at 60-MHz. These compare quite favorably with the Cx/Co's of 0.86% of large gap and piezoelectric alternatives, all while preserving comparatively larger Q's, e.g., 30000 versus 2100. Unfortunately, such performance comes with a price, in this case, greater susceptibility to stress. Indeed, thermal expansion-derived strain impacts small gaps much more than large gaps, to the point of debilitating large mechanical circuits of small-gapped resonators in the absence of corrective measures.

Figure 2:
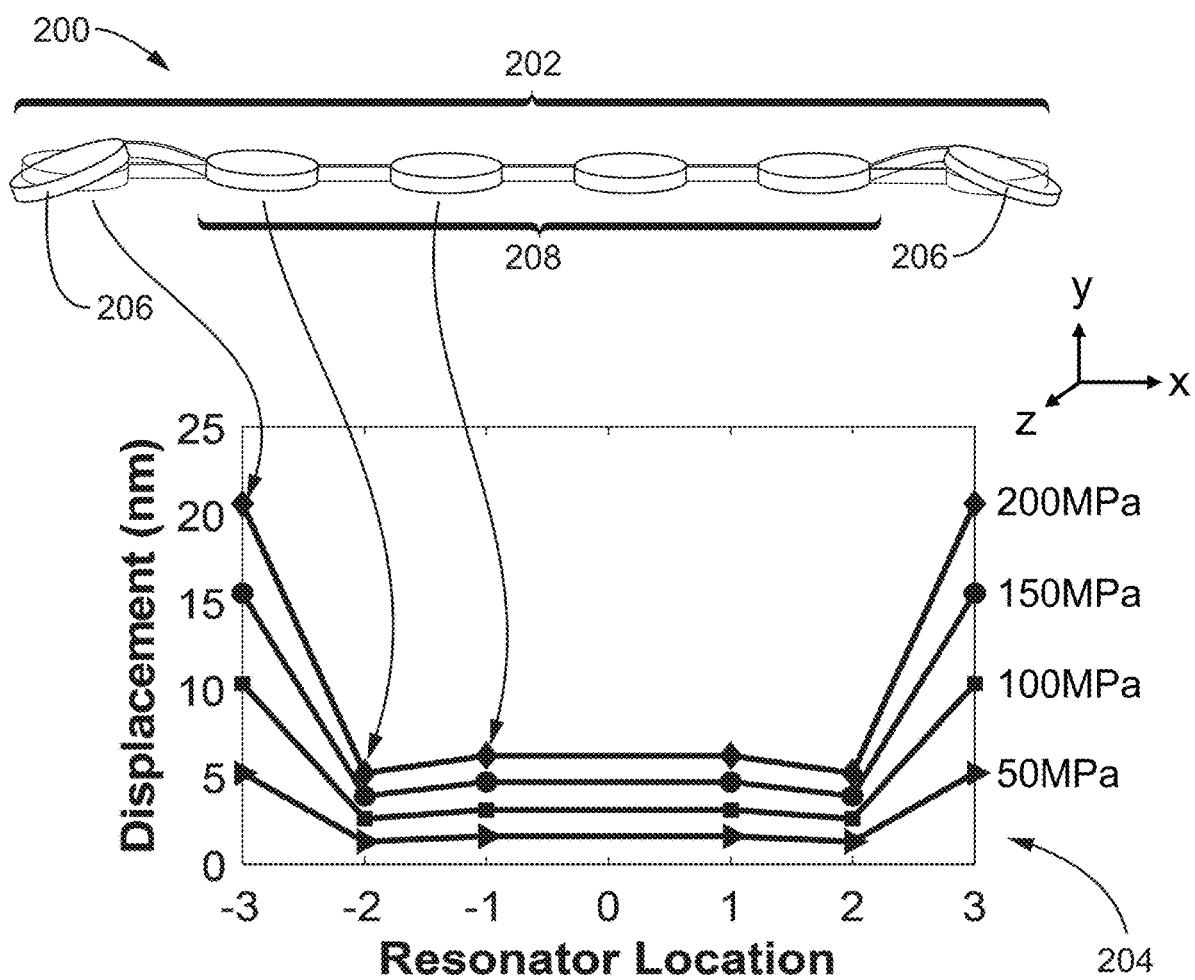
FIG. 2 is a finite-element simulated view of strain-induced x-axial displacement versus location for disks in a 6-disk polysilicon mechanically-coupled array under various compressive residual stress levels, atop a graph of the position versus displacement for the modeled displacements.

Refer now to FIG. 2, which is a depiction 200 of a 6-disk coupled linear array 202 and a graph 204 of the corresponding displacements and stresses. This depiction 200 shows that accurate knowledge of strain might be the single most important constraint on the ultimate size and performance of an array-based mechanical circuit. For example, finite element analysis (FEA) on a 6-disk coupled linear array 202 under different compressive stress levels shows that end resonators 206 displace the most, i.e., 20 nm at 200 MPa (as seen on the graph 204), while the inside ones 208 barely move, i.e., 6 nm at 200 MPa (as seen on the graph 204).

One mechanical channel-select filter design takes advantage of the end resonator 206 absorbing the majority of strain-induced displacements by removing the electrodes around the end resonators 206 (that would otherwise short) and using them instead as buffers to suppress the strain-derived displacements for the inside disks. Although this buffering method is effective for the array of 40-nm-gap devices, it might not suffice for ultra-small gaps, i.e., sub-5 nm, which are likely on the developmental horizon. The desire for sub-5 nm gaps increases the need to minimize post-fabrication residual strain. This need will likely spur extensive fabrication recipe optimization, which in turn calls for a very sensitive, high resolution strain diagnostic tool.

Although not shown in the depiction 200 of FIG. 2, each of the disk oscillators are mounted via individual stems to a common substrate.

Unfortunately, existing residual strain measurement techniques, including wafer bow and various on-chip approaches, either lack the precision to permit the most aggressive mechanical circuit designs or require a large footprint area. For example, the Vernier stress gauge uses visual readout of indicator beam movement under a microscope, which is inherently imprecise. In addition, its sensitivity is directly proportional to its indicator beam length, which acts as a lever to amplify Vernier movement. Apart from occupying a large die area, the 100 µm-long beam lengths need to measure stress down to 15 MPa are susceptible to stiction and vertical stress gradients that bend them out of plane, rendering them unusable. The Vernier stress gauge is discussed further below.

Pursuant to providing a more capable strain sensor, this Example A presents an on-chip, spoke-supported ring-based strain measurement device 100 structure, shown in FIG. 1A, that harnesses precision frequency measurement to precisely extract sub-nm displacements, allowing it to determine the residual strain in a given structural film with unprecedented accuracy, with measured stresses as small as 15 MPa.

Device Structure And Operation

Refer back to FIG. 1A. Here, a strain measurement device 100 comprises a spoke-supported doped polysilicon ring resonator 102 structure surrounded by matched inside and outside capacitive-gap transducers (respectively 104 and 106) that are doped polysilicon electrodes. The device 100 conveniently fabricates alongside tiny-gap mechanical filters, making it well-suited for diagnostic (or real-time) gap-control applications.

Figure 3A:
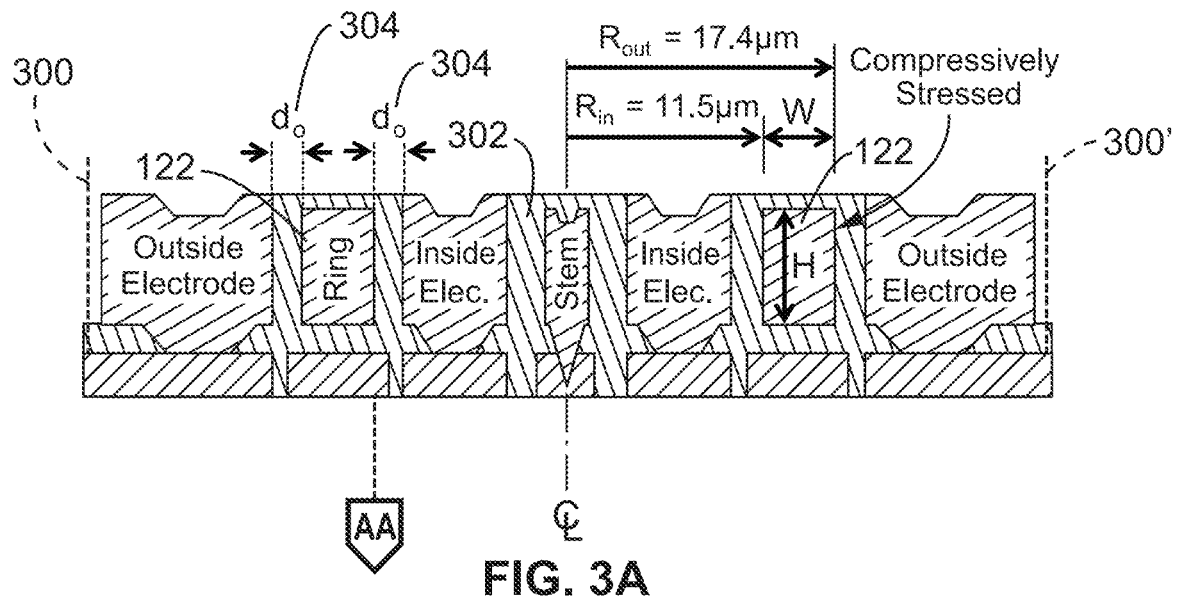
FIG. 3A is a cross-section 300-300' of the device of FIG. 1A before release.

Refer now to FIGS. 1A and 3A. FIG. 3A is a cross section 300-300' of the strain sensor device 100 of FIG. 1A at the process step immediately before release, where a sacrificial oxide 302 encases the ring resonator 102 structure. At this point, the electrode edges would ideally be the sidewall sacrificial oxide thickness $d_0$ 304 from the ring edges. In this state, the film is under residual stresses due to thermal expansion differences with the substrate that manifest upon cooling from the fabrication deposition temperature to room temperature.

Figure 3B:
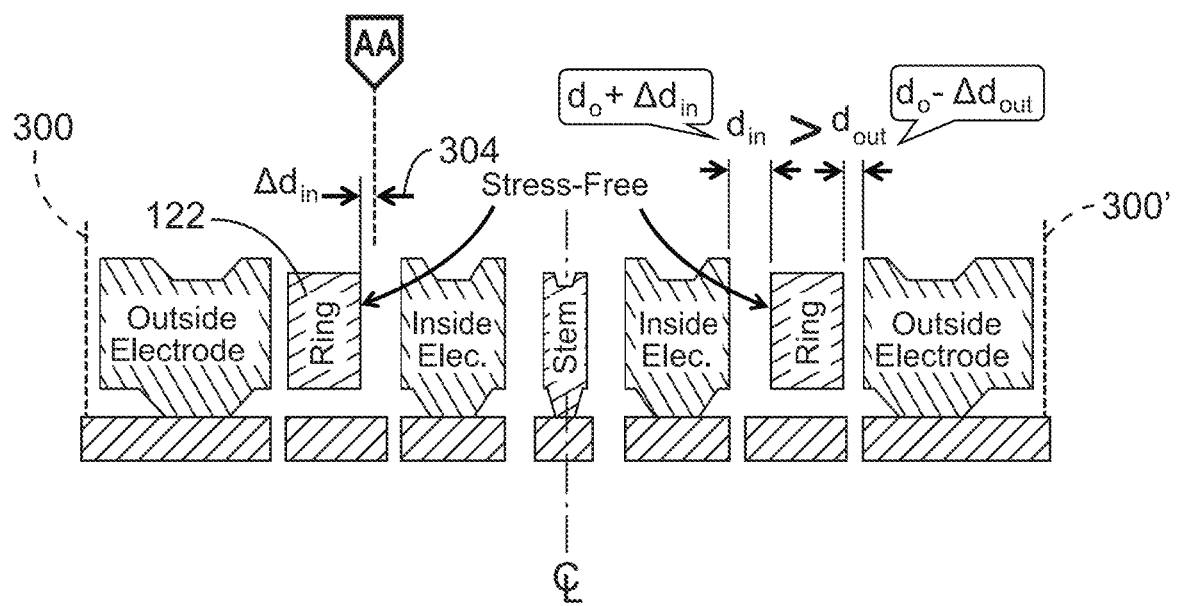
FIG. 3B is a cross-section 300-300' of the device of FIG. 1A after release.

Refer now to FIGS. 1A, 3A and 3B. FIGS. 3A and 3B are cross sections 300-300' of the strain measurement device 100 of FIG. 1A. In FIG. 3A, the sacrificial oxide 302 acts as a spacer in the manufacture of the device. In FIG. 3B, removal of sacrificial oxide 302 (via hydrofluoric acid) previously found in FIG. 3A releases not only the structure, but also the stress, allowing the strain measurement device 100 and substrate-anchored electrodes (found as inside sense electrode 106 and outside sense electrode 110 in FIG. 1A) to freely displace relative to one another. In this case, the stress removal results in a change in ring 122 inside diameter of $\Delta d_{in}$ 306.

Figure 3C:
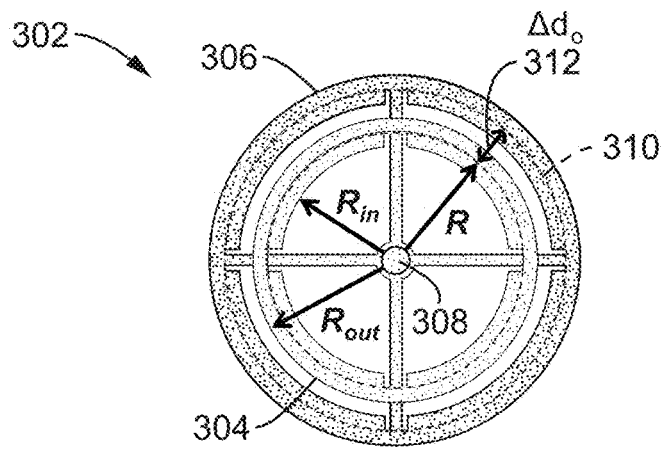
FIG. 3C is a top view of the resonator device of FIG. 1A, contrasting the ring displacement of the resonator before (FIG. 3A) and after (FIG. 3B) release.

Refer now to FIG. 1A and FIG. 3C. FIG. 3C is a top view 308 of the pre-released ring 122 of FIG. 3A, superimposed with the post-released ring 122 of FIG. 3B. Accordingly, the value of residual strain ε takes the form $$\varepsilon = \frac{\sigma}{E} = \frac{\Delta d_0}{R} \quad (1)$$

where σ is the residual stress, E is the Young's modulus of the ring resonator 102 material, R is the distance from the center 310 of the stem 118 to the center of the post-released ring width 312, i.e., average ring 122 radius in FIG. 3C, and $\Delta d_0$ 314 is the strain-induced radial displacement at the average ring 122 radius, given by $$\Delta d_0 = d_{out} - d_0 = d_0 - d_{in} \quad (2)$$

Equation (1) indicates a linear relationship between strain and actuation gap for small displacements, where measuring strain essentially amounts to measuring $\Delta d_0$ 314. The small size of the proposed structure (cf. Table 1) predicates gap changes on the order of 1 nm, which require a very sensitive measurement method. Here, frequency-based metrology employing the bias, excitation, and sensing scheme shown in FIG. 1A offers an excellent approach.

Specifically, when the electrode-to-resonator gaps are small, the resonance frequency of the ring structure becomes a strong function of electrical stiffness, which is in turn strongly dependent on gap spacing. Here, the expression for resonance frequency takes the form $$f_{in(out)} = \sqrt{f_{nom}^2 - \frac{\varepsilon_o V_p^2}{2\pi^3 \rho W R} \frac{R_{in(out)} \theta_{in(out)}}{\chi_{in(out)} d_{in(out)}^3}} \quad (3)$$

where $\varepsilon_o$ is the free-space permittivity, ρ is the density of the structural material, $V_p$ is the DC-bias voltage, $R_{in(out)}$ is the distance from inside (or outside) edge of the annulus to the stem, $d_{in(out)}$ is the inside (or outside) electrode actuation gap, $\theta_{in(out)}$ is the inside (or outside) electrode subtended angle in radians, W is the annulus width, $\chi_{in(out)}$ is a mass modifier factor relating the actual physical mass to the dynamic mass at the inside (or outside) edge of the annulus, and $f_{nom}$ is the mechanical (or nominal) resonance frequency for the ring 122, i.e. with no applied voltages.

Given this, measuring gap change (hence, strain) entails first measuring the resonance frequency of the ring for various DC-bias voltages $V_p$ 126 applied between the ring 122 and either the inside or outside sense electrode (respectively 106 and 110), then curve fitting via Equation (3) to obtain $f_{nom}$ and either $d_{in}$ or $d_{out}$. $\Delta d_0$ is then the difference between this extracted gap and the nominal gap, $d_0$.

Figure 4:
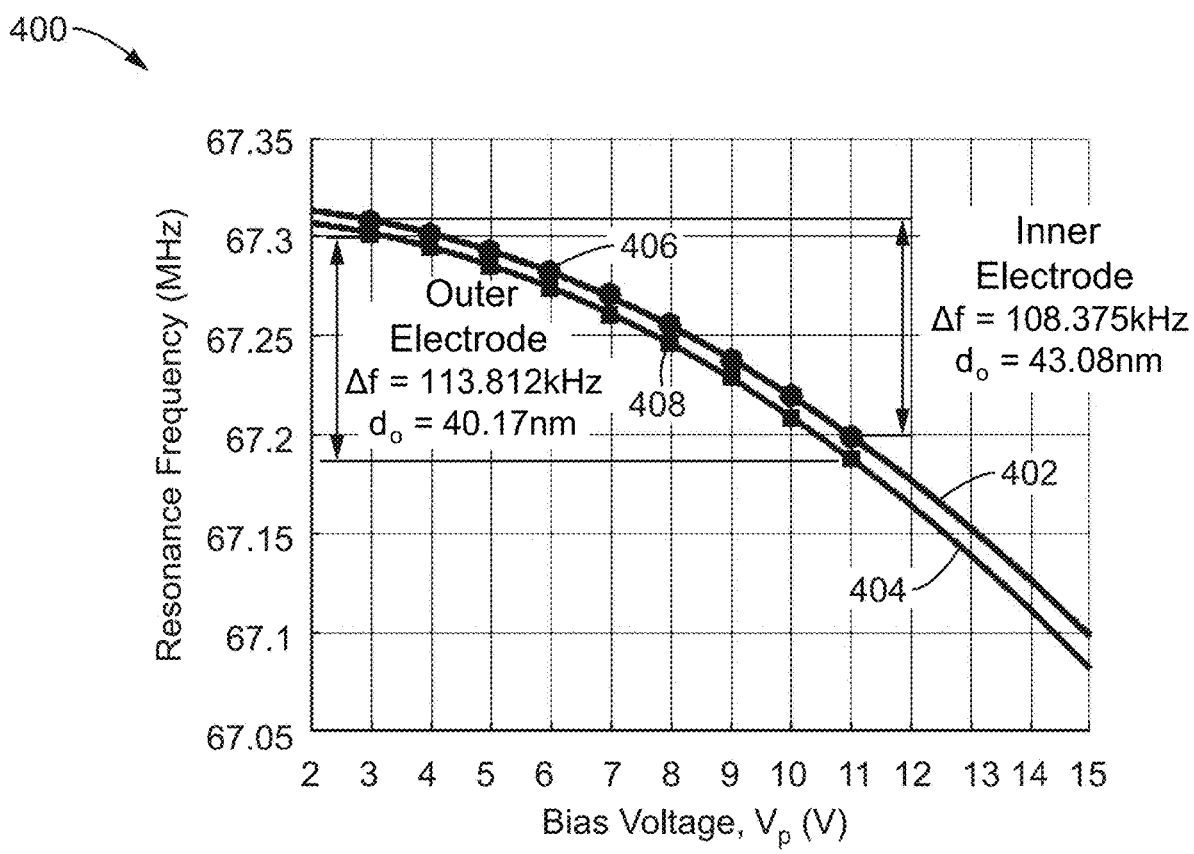
FIG. 4 is a graph of measured frequency versus DC-bias voltage data with curve fits used to extract the inside and outside electrode-to-resonator gaps.

Refer now to FIG. 4, which is a graph 400 of resonant frequency versus DC-bias voltage $V_p$ for the inside sense electrode (106 of FIG. 1A), and outside sense electrode (110 of FIG. 1A). Here, the curve fits of the inside sense electrode 402 and outside sense electrode 404 data are demarked by dots 406 and squares 408 (respectively) that indicate actual measurements.

Although quite straightforward, one issue limiting the accuracy with this differential measurement approach is its dependence on the initial gap, $d_0$ determined by the sidewall sacrificial layer deposition thickness, which could deviate from the target. To quantify this, a 1 nm uncertainty in the initial gap, hence $\Delta d_0$, causes 69.2με error in strain, or 10.9 MPa in stress for polysilicon, using Equation (1) with the parameters given in Table 1. Considering that target stresses might be as small as 15 MPa, this much error is not acceptable and calls for a better stress extraction technique independent of the starting gap $d_0$.

Recognizing that after release the outside electrode gap shrinks (expands) as much as the inside electrode expands (shrinks), a balanced measurement entailing separate extraction of inside and outside electrode gaps, $d_{in}$ and $d_{out}$, respectively, removes the dependency on the initial gap according to $$\Delta d_o = \frac{d_{out} - d_{in}}{2} \quad (4)$$

Substituting Equation (4) into Equation (1) yields the residual strain, ε:

$$\varepsilon = \frac{\sigma}{E} = \frac{d_{out} - d_{in}}{2R} \quad (5)$$

As will be seen, the dependence is strong enough and frequency measurement precision good enough that even sub-nm gap changes are precisely measurable.

Experimental Results

Figure 5B:
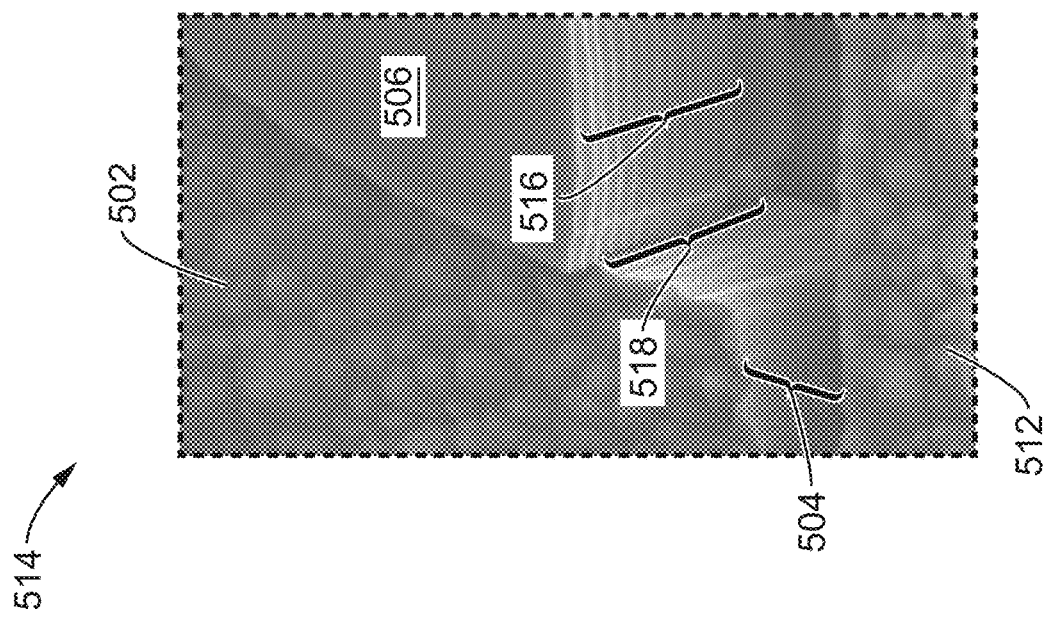
FIG. 5B is an enlarged view of the gap produced after fabrication of the polysilicon strain diagnostic device of FIG. 5A.
Figure 5A:
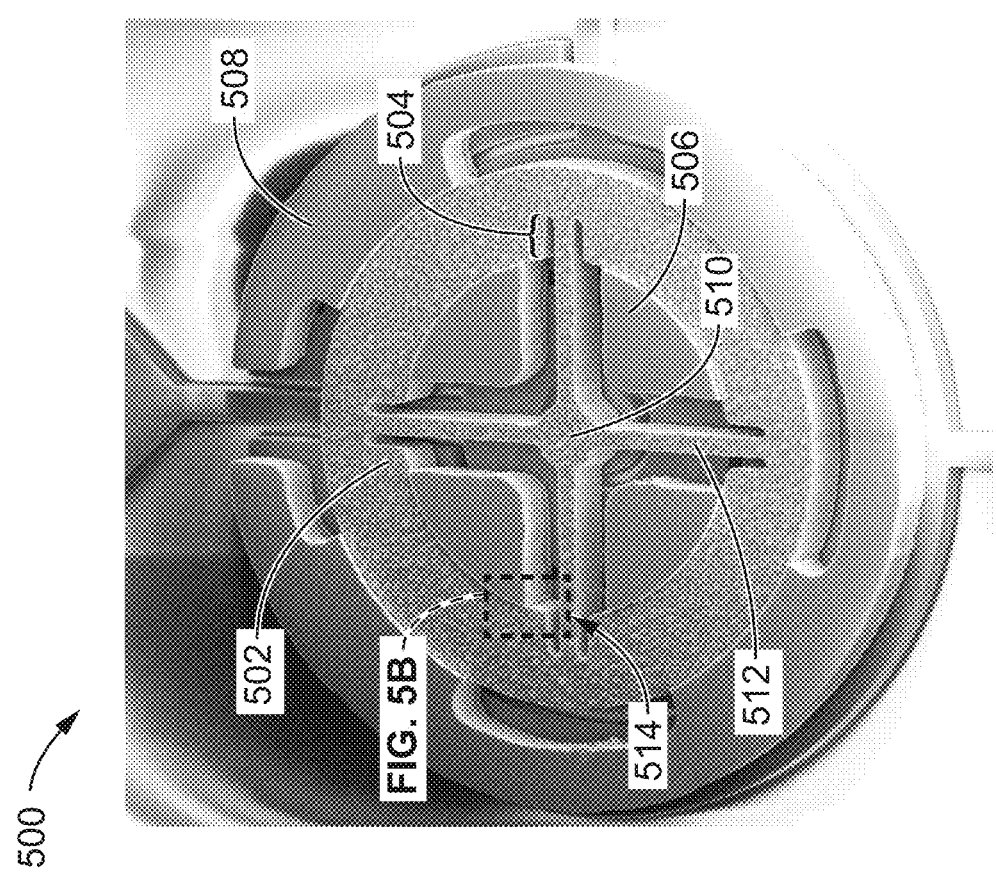
FIG. 5A is a scanning electron micrograph (SEM) of a fabricated ring-based polysilicon strain diagnostic device.

FIG. 5A is a scanning electron micrograph 500 of a ring-based residual strain gauge (which was fabricated alongside tiny-gap mechanical filters). Here, it is seen that the ring resonator 502 has been fabricated with notches 504 for vibration isolation. This view allows for easier visualization of the inside capacitive-gap transducer 506, the outside capacitive-gap transducers 508, the support stem 510 and support spokes 512. A zoomed region 514 details the region where sensing occurs.

Refer now to both FIGS. 5A and 5B. FIG. 5B is a zoomed region 514 of the SEM of FIG. 5A, enlarging the notched region 504 adjacent to the support spoke 512. Here the sidewalls of electrode 516 exhibit scallops 516 due to Deep Reactive Ion Etching (DRIE) processing, but the disk sidewalls are much smoother due to use of a smoother etch recipe based on a $Cl_2$ and HBr etchant combination. Finally, an air gap 518 is observed between the ring resonator 502 and the inside capacitive-gap transducer 506.

Figure 6A:
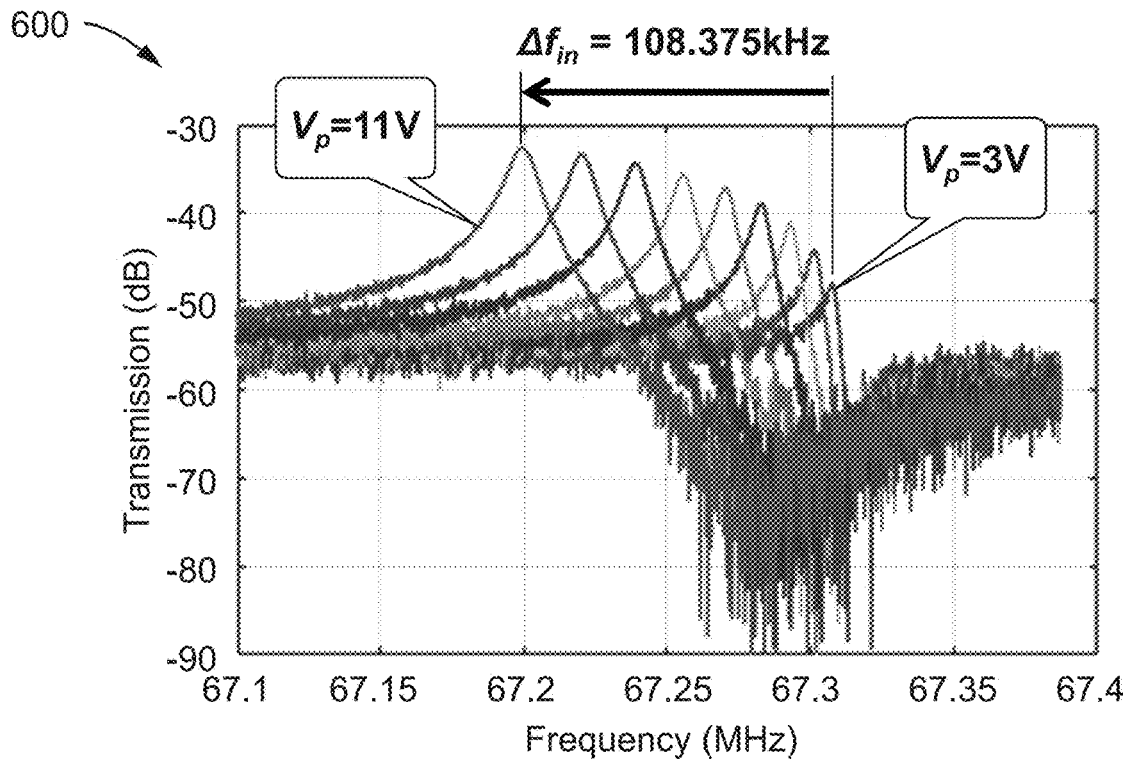
FIG. 6A is a graph of the measured frequency spectra for a ring strain diagnostic device as a function of DC-bias voltage using the inside sense electrode.

Refer now to FIG. 6A, which is a graph 600 of the vacuum-measured transmission spectra for the ring resonator (102 of FIG. 1A) operating in its first mode shape (shown in FIG. 1B) while driven via the drive electrode (128 of FIG. 1A) and measured by the inside sense electrode (106 of FIG. 1A). Here, DC-bias voltage $V_p$ (126 of FIG. 1A) is varied from 3-11 V, with corresponding transmission peak frequency shifts that amount to a $\Delta f_{in}$ of 108.375 kHz. These data points were used in the graph of FIG. 4 to curve fit an inside $d_0$ of 43.08 nm.

Figure 6B:
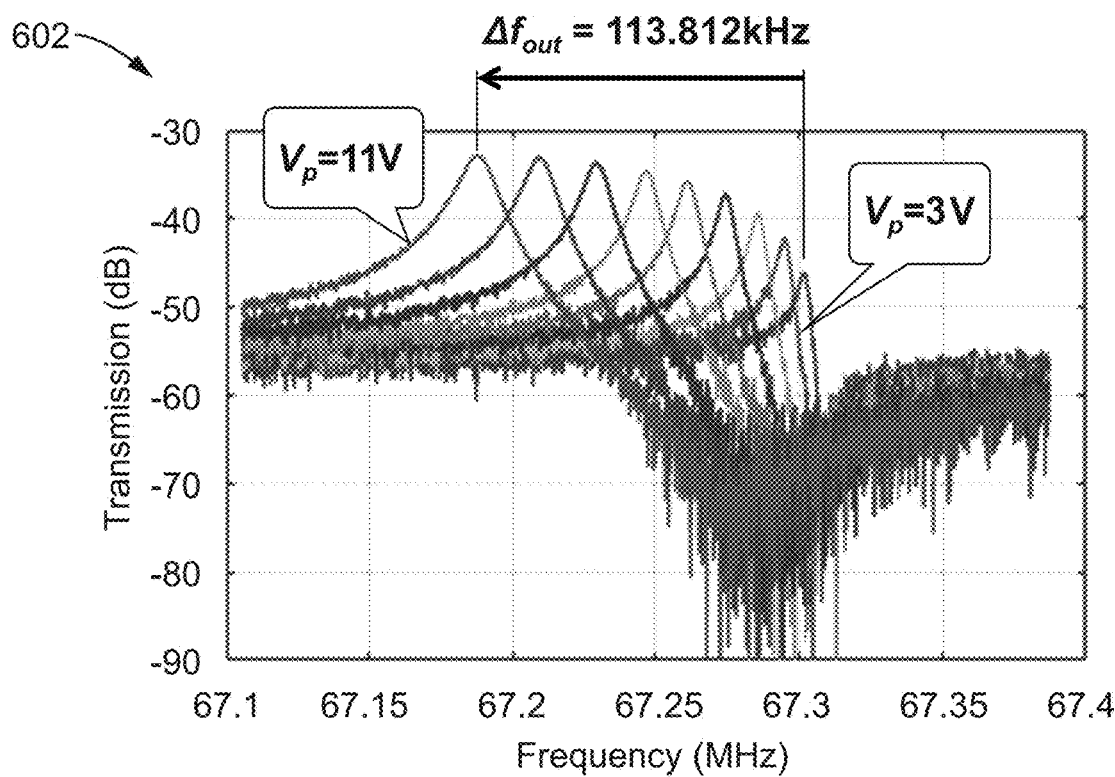
FIG. 6B is a graph of the measured frequency spectra for a ring strain diagnostic device as a function of DC-bias voltage using the outside sense electrode.

Refer now to FIG. 6B, which is a graph 602 of the vacuum-measured transmission spectra for the ring resonator (102 of FIG. 1A) operating in its first mode shape (shown in FIG. 1B) while driven via the drive electrode (128 of FIG. 1A), and measured by the outside sense electrode (110 of FIG. 1A). Here, DC-bias voltage $V_p$ (126 of FIG. 1A) is varied from 3-11 V, with corresponding transmission peak frequency shifts that amount to a $\Delta f_{out}$ of 113.812 kHz.

These data points were used in the graph of FIG. 4 to curve fit an outside $d_o$ of 40.17 nm.

Refer now to both FIGS. 6A and 6B. The difference in frequency excursion for the inside measurement (FIG. 6A) case indicates a difference in electrode-to-resonator gap spacing that extracts very precisely upon curve-fitting the data, as previously shown in FIG. 4. Here, the inside gap is 43.08 nm, while the outside gap 40.17 nm. The difference between these two measurements comprises directional changes from the extracted starting 41.65-nm gap that very precisely indicates 15.05 MPa of compressive residual stress. Opposite gap changes, i.e., where the inside gap decreased and outside gap increased, would indicate a tensile stress, and would be measurable just as precisely.

Scale Factor (Sensitivity)

Scale factor (or sensitivity) for a resonant sensor is a measure of its frequency shift per unit strain, here simply corresponding to the slope of the resonance frequency vs. strain curve before any gap change takes place, i.e., when $d_{in}=d_{out}=d_0$, as follows $$\left(\frac{\partial f_o}{\partial \varepsilon}\right)_{in(out)} = -(+)\frac{3\varepsilon_o V_P^2}{4\pi^3 \rho W f_{nom}} \frac{R_{in(out)}\theta_{in(out)}}{\chi_{in(out)}d_o^4} \quad (6)$$

Note that in Equation (6) positive strain corresponds to tensile stress, while negative strain corresponds to compressive stress. The aforementioned balanced measurement scheme further enhances the scale factor according to $$\frac{\partial f_o}{\partial \varepsilon} = \left(\frac{\partial f_o}{\partial \varepsilon}\right)_{out} - \left(\frac{\partial f_o}{\partial \varepsilon}\right)_{in} \quad (7)$$

Noting that the overlap area, $A_{ov}$, for the inside and outside electrodes are the same using the values in Table 1 and substituting Equation (6) in Equation (7) yields:

$$\frac{\partial f_o}{\partial \varepsilon} = \frac{3\varepsilon_o V_P^2 A_{ov}}{2\pi^3 \rho W H f_{nom} d_o^4} \quad (8)$$

The fourth power inverse dependence of the scale factor on the actuation gap $d_0$ makes this sensor extremely sensitive considering its nominal ~40 nm gaps. Equation (8) in fact predicts a scale factor of 291.54 Hz/με for the strain sensor of FIG. 1A with the parameters outlined in Table 1 under an 11 V DC-bias voltage $V_p$ (126 of FIG. 1A).

Resolution

Resolution is the minimum strain that the sensor of FIG. 1A can accurately measure through its transduction mechanism, i.e., strain to frequency conversion. Here, the minimum resolvable resonance frequency shift—largely governed by the resonator's short-term frequency stability—sets the lower resolution limit. Fortunately, the high Q of capacitive-gap polysilicon resonators at HF permits them to exhibit excellent short-term stability. In particular, one 61-MHz wine-glass disk resonator posts an Allan deviation, $\sigma_{ymin}$ of $2\times10^{-8}$ at a 1s integration time. Given the Allan deviation, the expression for frequency jitter $\Delta f$ takes the form $$\Delta f = \sigma_{ymin} f_o \quad (9)$$

The resolution, $\Delta\varepsilon$ is then $$\Delta\varepsilon = \Delta f \left(\frac{\partial f_o}{\partial \varepsilon}\right)_{in(out)}^{-1} \quad (10)$$

Finally, substituting Equations (6) and (9) in Equation (10) yields $$\Delta\varepsilon = \sigma_{ymin} f_o \frac{4\pi^3 \rho W H f_{nom}}{3\varepsilon_o V_P^2 A_{ov}} d_o^4 \quad (11)$$

If one supposes the ring resonator herein posts the Allan deviation performance of the wine-glass disk, then Equation (11) with the parameters in Table 1 and assuming an 11V DC-bias voltage $V_p$ (126 of FIG. 1A) yields a resolution of 9.19nε. Of course, this is a calculated value that requires measured verification. But if real, it exceeds the resolution of many other published on-chip strain sensors, as shown in Table 2.

Range

The initial gap, $d_0$ determines maximum permissible strain-induced ring displacement. The corresponding maximum measurable strain $\varepsilon_{max}$ then follows by taking $\Delta d_0 = d_0$ in Equation (1), which yields $$\varepsilon_{max} = \frac{d_o}{R} \quad (12)$$

Using Equation (12), the device shown here with an initial gap of 40 nm has a maximum measurable strain of ±2768 με, which corresponds to ±415.2 MPa of stress for polysilicon.

The frequency output provided by gap-dependent electrical stiffness permits the strain sensor described herein to achieve a combination of small size, large scale factor, low resolution, and large measurement range that outpace alternatives, in some cases by substantial margins. Although the described sensor tailors specifically to tiny-gap devices, it is not difficult to see that its underlying approach will work regardless of the process or gap used.

Although presented as a diagnostic tool, this device is clearly applicable as a general strain sensor. Indeed, its small size and high performance make it a strong candidate for use as an in situ strain sensor that might measure real-time strain changes—due to package stress, thermal variations, or other sources—to then allow real-time corrections. Such an approach could play a significant role towards improving the long-term stability of capacitive-gap transduced oscillators beyond their already impressive marks.

Example B

Beam-Based Precision Residual Strain Sensor Employing Gap-Dependent Frequency Shift To emphasize the fact that a variety of embodiments are possible, this Example B presents a beam-based embodiment of an electrical-stiffness-based strain sensor. Recall that Example A previously discussed a ring-based electrical-stiffness-based strain sensor.

A micromechanical structure for residual strain sensing maps strain-induced gap changes to resonance frequency shifts while employing differential strategies to null out bias uncertainty, all towards repeatable measurement of sub-nm displacement changes that equate to sub-με increments. Here, gap-dependent electrical stiffness is used to shift resonance frequencies as structural elements stretch or shrink to relieve strain. An output based on the differential frequency between two close proximity structures with unequal stress arm lengths removes uncertainty on the initial gap spacing and permits a 210 Hz/µε scale factor. The ability to precisely measure the frequency of the high-Q (~4000) structures, down to at least 1 Hz, puts the resolution of this sensor at least 5 nε (or 790 Pa for polysilicon). An on-chip highly sensitive strain diagnostic device like this will likely be instrumental to managing stress changes over the lifetime of micromechanical circuits, such as oscillators and filters.

Introduction

To this point, existing residual stress sensors in the literature are either not sufficiently sensitive or plagued by practical fabrication-related imperfections. For example, the popular Vernier stress gauge requires visual determination of indicator beam movement under a microscope—a procedure that clearly lacks precision and fails to lead to automated solutions.

Figure 7:
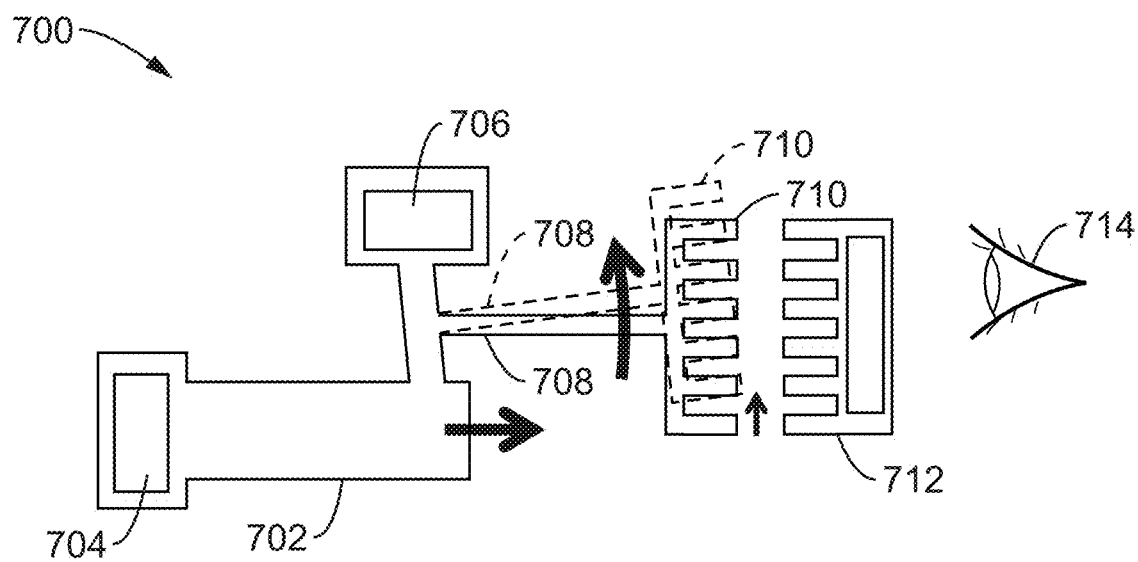
FIG. 7 is a diagram of the operation of a prior art Vernier stress gauge.

Refer now to FIG. 7, which is a diagram of the operation of a standard Vernier stress gauge 700. Here, a test beam 702 is subjected to a stress between anchors 704 and 706, which causes a deflection of an indicator beam 708 that deflects indicator fingers 710 relative to a set of reference fingers 712. The relative deflection is determined by microscopic visual inspection 714.

This structure also is most sensitive when its indicator beam 708 is long, since this amplifies its movement under a given residual strain. The need for long length, however, renders the device vulnerable to vertical stress gradients, placing a limit on the minimum measurable stress. The quest for higher resolution calls for a sensor with a more precise readout method, e.g., frequency, which better decouples strain resolution from structure size.

Beam Resonator Residual Strain Diagnostic

Figure 8A:
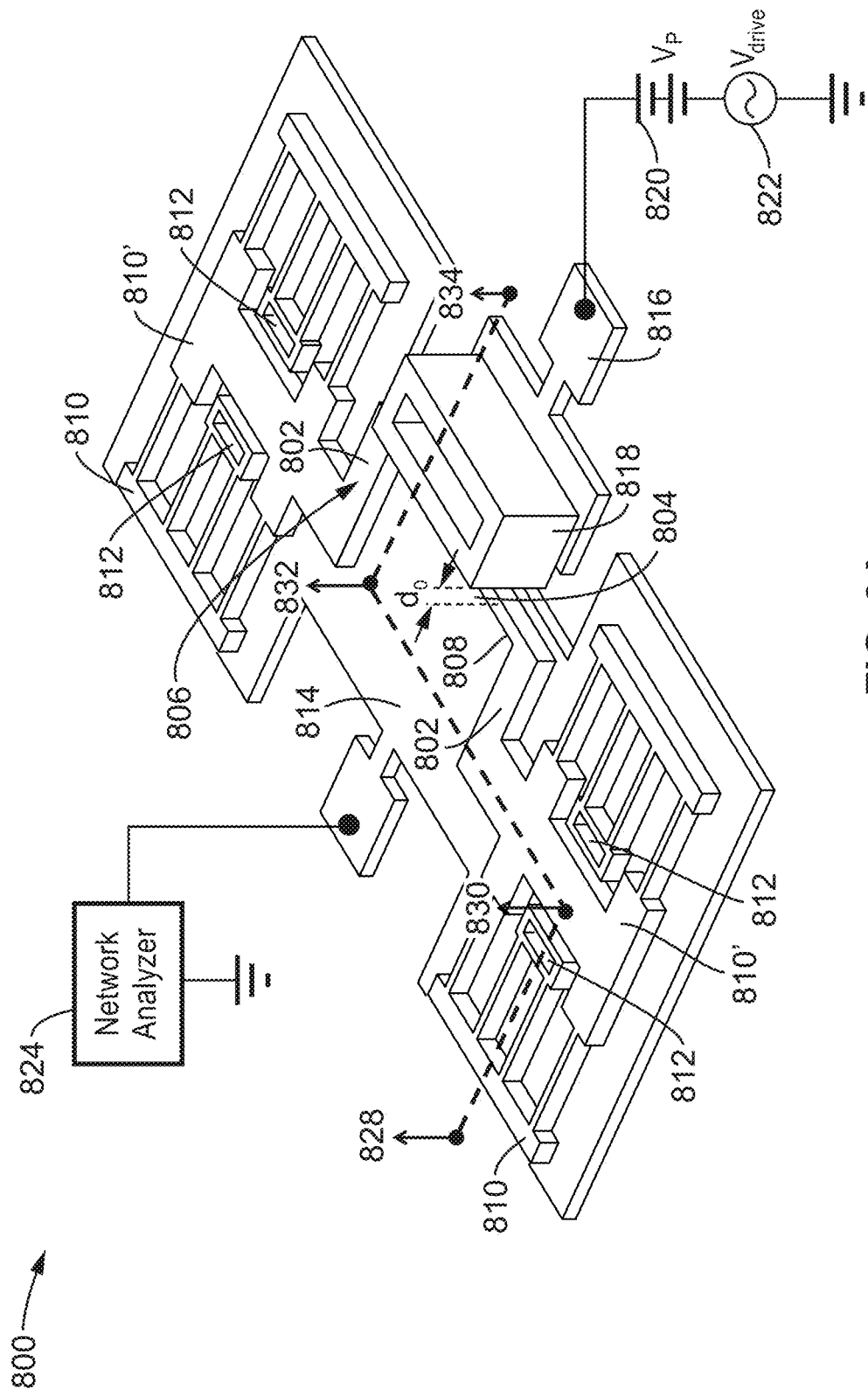
FIG. 8A is a perspective view of a residual strain sensor in a typical operating circuit along with key dimensions that measures the nm-level expansion or contraction of a movable stress arm as a change in capacitive transduction gap.

Refer now to FIG. 8A, which is a view of a residual strain sensor 800 that addresses the previously discussed issues by measuring the nm-level expansion/contraction of a movable stress arm 802 of length $L_s$ as a change in capacitive transduction gap $d_0$ 804. A resonant structure 806 is comprised of a beam resonator 808 connected to two stress arms 802, then to two folded support beams 810, 810' that are anchored 812 to a substrate 814. The entire resonant structure 806 is free to vibrate relative to the substrate 814, except where anchored 812. The resonant structure 806 is driven via a drive electrode 816, electrically connected to the resonant structure 806. The drive electrode 816 conducts to a drive structure 818 that forms the capacitive transduction gap $d_0$ 804 between the beam resonator 808 and the drive structure 818. The drive electrode 816 is driven by a DC-bias voltage $V_p$ 820 and a waveform $V_{drive}$ applied in series.

The vibrational characteristics of the residual strain sensor 800 are measured by an analyzer 824. It is understood that the analyzer 824 and the waveform $V_{drive}$ 822 share a common signal ground. Analyzer 824 can be, for example, one or more of a network analyzer, one or more of a spectrum analyzer, or one or more of a frequency counter.

Figure 8B:
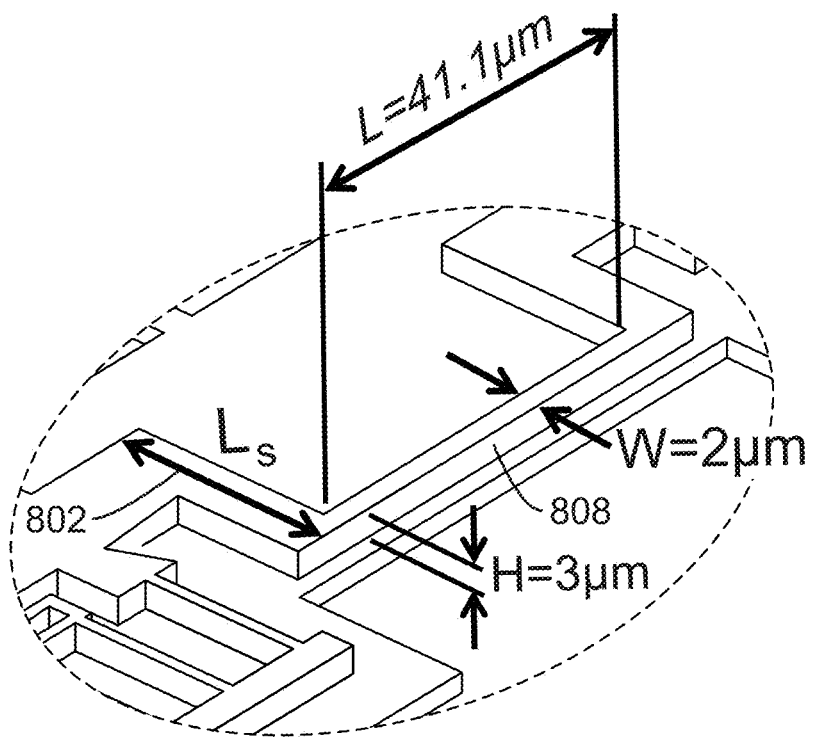
FIG. 8B is an inset section of the residual strain sensor of FIG. 8A.

Refer now to FIG. 8B, which is an inset section of the residual strain sensor 800 of FIG. 8A. Here, the nominal dimensions of the beam resonator 808 are shown to be 41.4 µm long×3 µm high×2 µm wide. Additionally, the movable stress arm 802 is shown to be of length $L_s$.

Figure 8C:
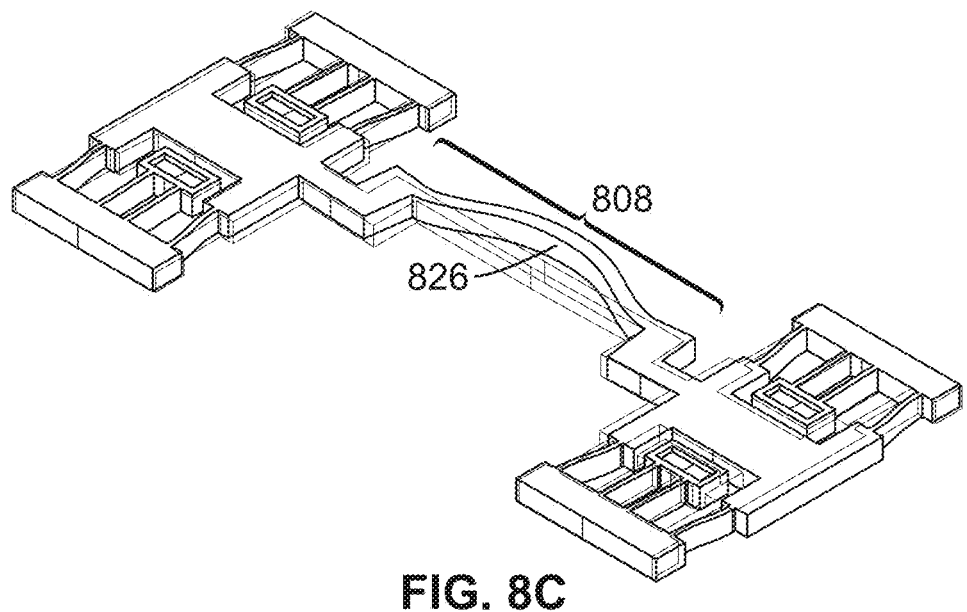
FIG. 8C is a finite element analysis (FEA) simulation of the modal characteristics of the beam resonator of FIG. 8A, showing maximum deflection in the center span.

Refer now to FIG. 8C, which is a finite element analysis (FEA) simulation of the modal characteristics of the beam resonator 808, showing maximum deflection at the center span 826 during strain determination.

Refer back now to FIG. 8A, where a walking section 828-830-832-834 is shown detailing portions of the residual strain sensor 800. These sections will be described below further in conjunction with FIGS. 9A and 9B.

Figure 9A:
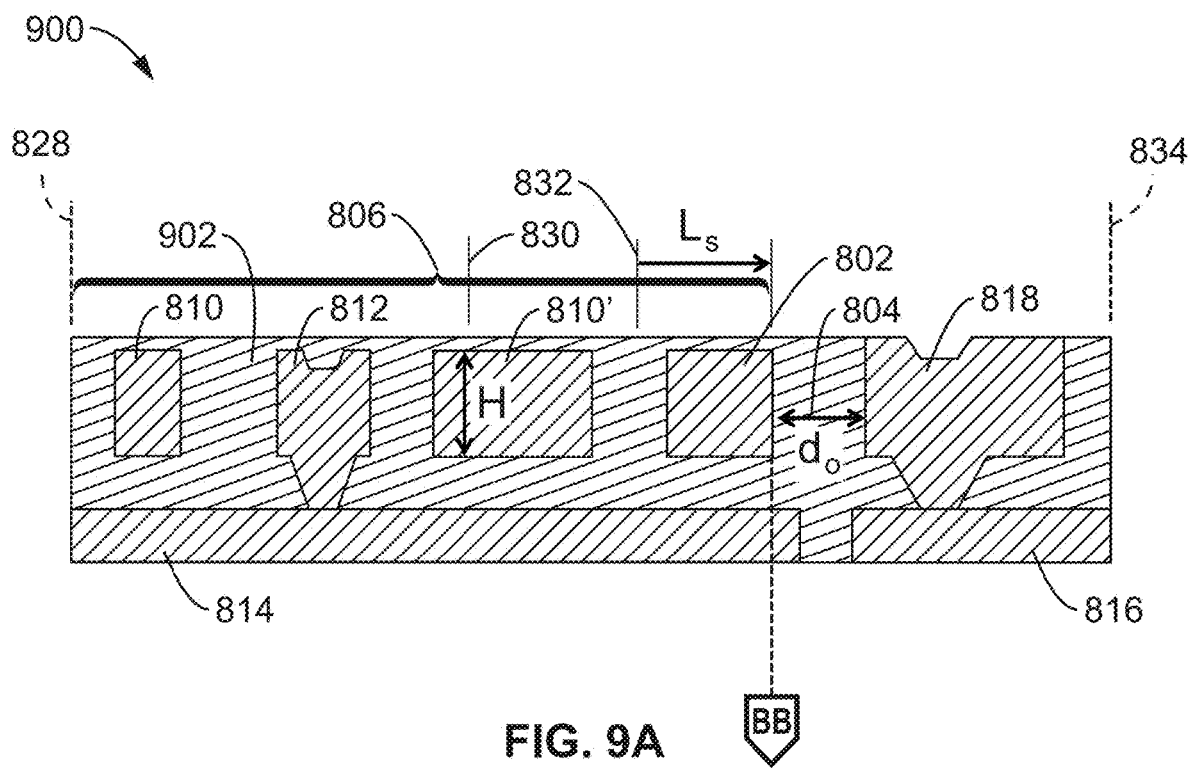
FIG. 9A shows a walked cross section of the resonant structure of FIG. 8A before release of a sacrificial layer.
Figure 9B:
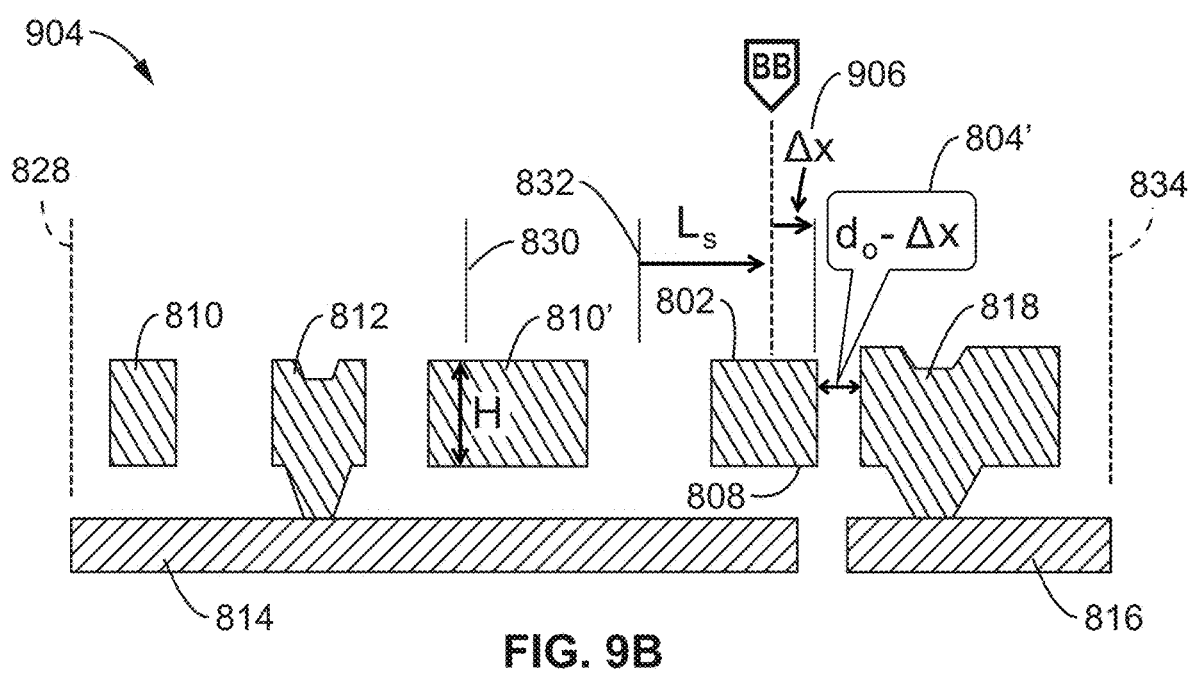
FIG. 9B shows a walked cross section of the resonant structure of FIG. 8A after release of the sacrificial layer.

Refer now to FIGS. 8A, 9A and 9B. FIG. 9A shows a walked cross section 900 of the resonant structure 806 of FIG. 8A before release of a sacrificial layer 902, where the resonant structure 806 is under compressive stress due to thermal expansion differences between the substrate 814 and resonant structural 806 layer, as depicted in FIG. 8A.

Equations modeling the operation of this beam-based embodiment follow from an analysis similar to that for the ring-based embodiment presented above in Example A, but are shown here for ease of understanding in the context of the beam-based drawings.

FIG. 9B shows 904 the walked cross section 900 of FIG. 9A after removing the sacrificial layer 902. Here, the stress arm 802 $L_s$ relieves compressive stress by stretching a few nanometers Δx 906, thereby shrinking the initial capacitive transduction gap $d_0$ to $d_0 - \Delta x$ 804' in proportion to its length, i.e., a longer arm leads to a larger reduction in the gap 804', according to $$\Delta d_0 = \varepsilon L_s \quad (13)$$

where $\Delta d_0$ is the strain-based gap change after release and ε is the residual strain. If the gap also serves in a capacitive-gap transducer for the indicated beam, the reduction in gap spacing induces an increase in electrical stiffness $k_e$ as:

$$k_e = \frac{3\varepsilon_o H L_e V_P^2}{(d_o - \Delta d_o)^3} \approx \frac{3\varepsilon_o H L_e V_P^2}{d_o^3}\left(1 + \frac{\Delta d_o}{d_o}\right) \quad (14)$$

where $\varepsilon_o$ is the free-space permittivity, H is the beam thickness, $L_e$ is the electrode length, and $V_p$ is the DC-bias voltage. This change in electrical stiffness in turn reduces the beam's resonance frequency to $$f_o = f_{nom}\sqrt{1 - k_e/k_m} \approx f_{nom}\left(1 - \frac{k_e}{2k_m}\right) \quad (15)$$

where $f_{nom}$ is the beam's nominal purely mechanical resonance frequency given as $$f_{nom} = 1.03\frac{H}{L^2}\sqrt{E/\rho} \quad (16)$$

where L is the beam length, E is the Young's modulus, ρ is the density, and $k_m$ is the mechanical stiffness given as $$k_m = 4a\pi^2 f_{nom}^2 \rho WHL \quad (17)$$

where W is the beam width and a is a constant relating the actual beam mass to the equivalent mass. Assuming the effect of electrical stiffness on the resonance frequency is small, and substituting Equations (13), (14) and (17) in (15), the frequency change $\Delta f_s$, which is precisely measurable, then gauges the strain according to $$\Delta f_s = f_o - f_{nom} = -\frac{3\varepsilon_o L_e V_P^2}{8a\pi^2 \rho W L f_{nom} d_o^3}\left(1 + \frac{\varepsilon L_s}{d_o}\right) \quad (18)$$

If the strain relieved gap $d_0-\Delta x$ 804' also serves in a capacitive-gap transducer for the indicated stress arm 802, the reduction in gap spacing $\Delta x$ 906 induces an increase in electrical stiffness, which in turn reduces the stress arm's 802 resonance frequency.

The frequency change, which is precisely measurable, then gauges the strain. Any post-fabrication strain, e.g., from package stress, whether positive or negative, will also shift the gap and frequency, so will be detected. The use of folded-beam supports for the beam rather than conventional anchors prevents beam buckling under heavy compressive stress.

Measurement Results

Figure 10:
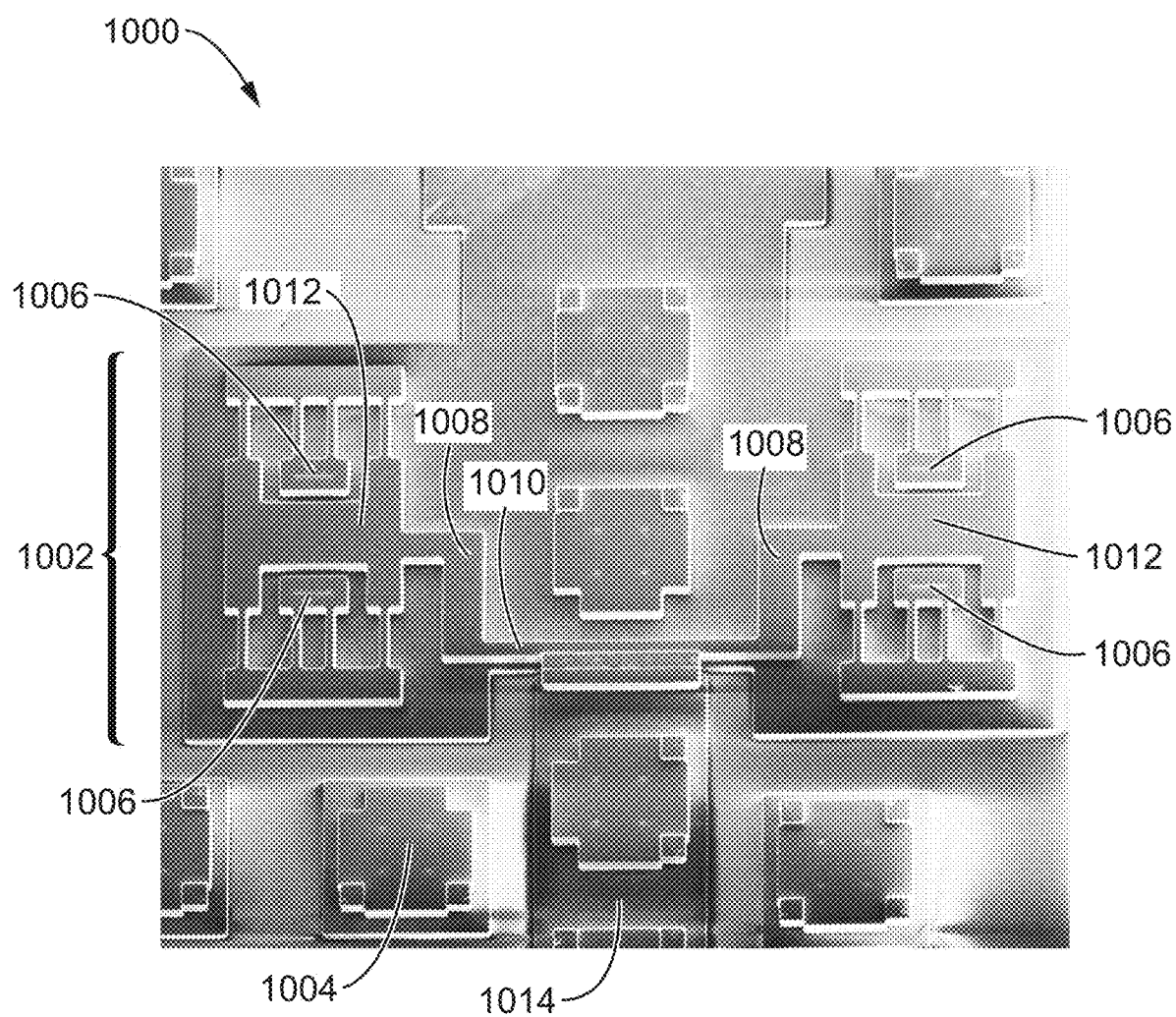
FIG. 10 is a scanning electron micrograph (SEM) of the top view of the residual strain sensor of FIG. 8A fabricated alongside tiny-gap mechanical filters, i.e., during the same fabrication process.

Refer now to FIG. 10, which is a scanning electron micrograph (SEM) of the top view 1000 of the residual strain sensor 1002 fabricated alongside tiny-gap mechanical filters 1004, i.e., in the same fabrication process. In this SEM view 1000, the residual strain sensor 1002 has some elements that are readily visible, including the anchors 1006, the movable stress arms 1008, the beam resonator 1010, the folded beam support 1012, drive electrode 1014, and the drive structure 1016.

Figure 11A:
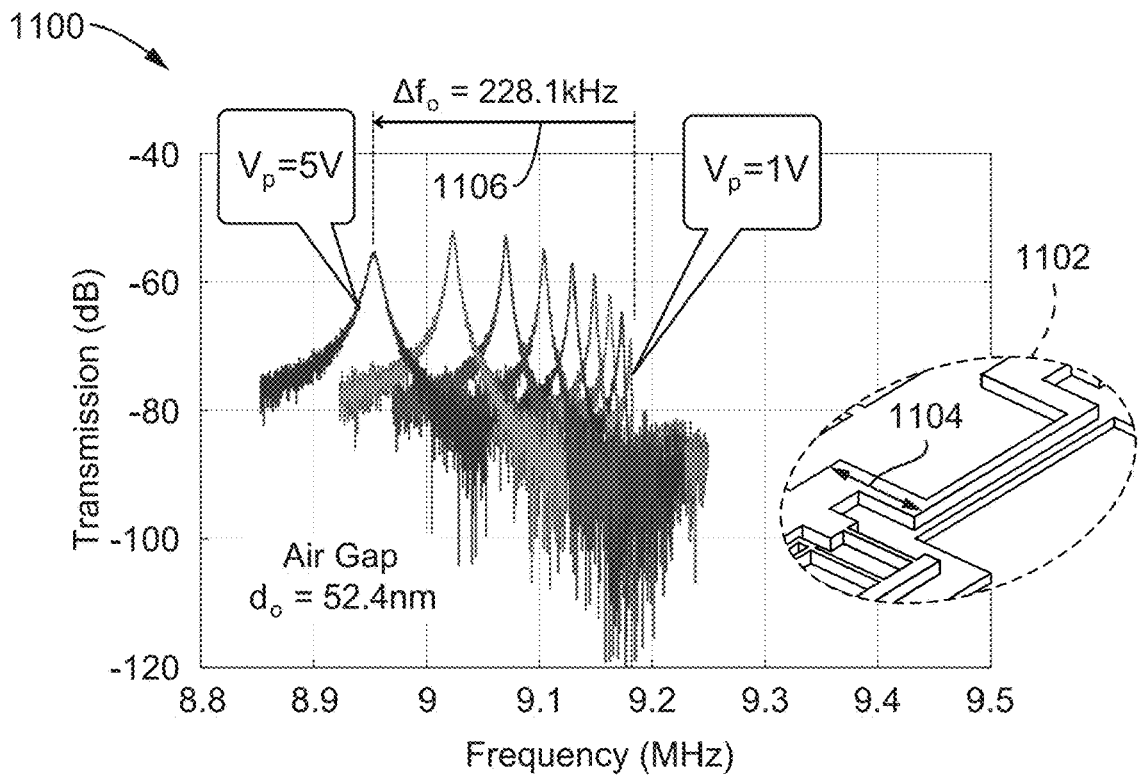
FIG. 11A is a graph of transmission versus frequency of a residual strain sensor of FIG. 8A with a stress arm length $L_s$ of 10 µm, providing a frequency shift $\Delta f_0$ of 228.1 kHz with an applied DC-bias voltage $V_p$ ranging from 1 to 5 V, which presented an air gap $d_0$ of 52.4 nm.

Refer now to FIG. 11A, which is a graph 1100 of transmission versus frequency of a residual strain sensor 1102 with a stress arm 1104 length of 10 μm. This device has been measured to provide a frequency shift 1106 $\Delta f_0$ of 228.1 kHz with an applied DC-bias voltage $V_p$ ranging from 1 to 5 V. The device presented an air gap $d_0$ of 52.4 nm.

Figure 11B:
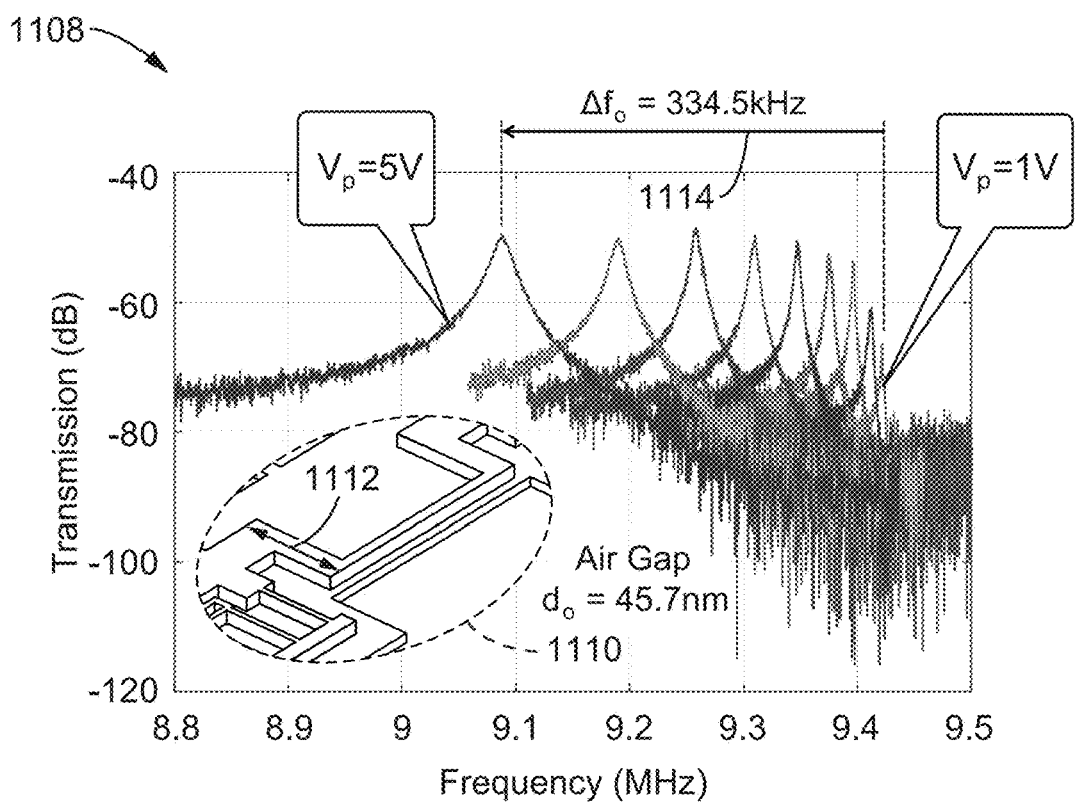
FIG. 11B is a graph of transmission versus frequency of a residual strain sensor with a stress arm $L_s$ length of 20 µm, providing a frequency shift $\Delta f_0$ of 334.5 kHz with an applied DC-bias voltage $V_p$ ranging from 1 to 5 V, which presented an air gap $d_0$ of 45.7 nm.

Refer now to FIG. 11B, which is a graph 1108 of transmission versus frequency of a residual strain sensor 1110 with a stress arm 1112 length of 20 μm. This device has been measured to provide a frequency shift $\Delta f_0$ of 334.5 kHz with an applied DC-bias voltage $V_p$ ranging from 1 to 5 V. The device presented an air gap $d_0$ of 45.7 nm.

Here, using Equation (18) directly with either of these structures requires precise knowledge of the starting gap to calculate $\Delta d_0$, which is usually difficult to obtain. To circumvent this issue and also avoid geometry- and fabrication-related offsets, using the difference in frequency shifts between the two structures offers a superior method as follows $$\Delta f = \Delta f_{s2} - \Delta f_{s1} = \frac{3\varepsilon_o L_e V_P^2 (L_{s2} - L_{s1})}{8\alpha\pi^2 \rho W L f_{nom} d_o^4} \varepsilon \quad (19)$$

where $L_{s1}$ and $L_{s2}$ are the support arm lengths for the two designs, respectively. Here, using a single nominal $d_0$ in the denominator helps obtain an intuitive closed-form expression without sacrificing significant accuracy.

A simple algebraic rearrangement of Equation (19) yields the strain measurement:

$$\varepsilon = \frac{8\alpha\pi^2 \rho W L f_{nom} d_o^4}{3\varepsilon_o L_e V_P^2 (L_{s2} - L_{s1})} \Delta f \quad (20)$$

A. Scale Factor (Sensitivity)

Scale factor or sensitivity of a resonant sensor indicates how much its frequency shifts in response to a change in strain. Employing this definition by taking partial derivative of Equation (19) with respect to strain yields $$\frac{\partial \Delta f}{\partial \varepsilon} = \frac{3\varepsilon_o L_e V_P^2 (L_{s2} - L_{s1})}{8\alpha\pi^2 \rho W L f_{nom} d_o^4} \quad (21)$$

The inverse 4th power dependence on the actuation gap $d_0$ generates extremely sensitive resonant sensors as gaps become smaller, i.e., sub-100 nm. The 106.4-kHz difference in frequency excursion in FIG. 6 over the same DC-bias voltage VP range corresponds to 24.4 MPa compressive stress. This puts the scale factor at 688.9 Hz/μ6 (4.36 Hz/kPa for polysilicon).

Refer now to both FIGS. 11A and 11B. Both residual strain sensor 1102 and 1110 were fabricated side by side and are identical in all respects except for different stress arm 1104 and 1112 lengths ($L_s'$) of 10 μm and 20 μm, respectively. The different lengths lead to final gaps $d_0$ extracted by curve-fitting the measurement data of 52.4 nm and 45.7 nm, respectively. The 106.4-kHz difference in frequency excursion over the same DC-bias voltage $V_p$ range indicates a 6.7 nm difference in electrode-to-resonator gap spacing between the two designs that corresponds to a 80 MPa compressive stress. This puts the scale factor at 210.2 Hz/με (1.3 Hz/kPa for polysilicon).

B. Resolution

Resolution, in the context of a resonant strain sensor, is the strain corresponding to the minimum detectable resonance frequency shift, which is usually limited by short-term frequency instability. Rearranging Equation (19) and replacing $\Delta f$ with $\sigma_{ymin} f_0$ where $\sigma_{ymin}$ is the Allan deviation yields $$\Delta \varepsilon = \frac{8\alpha\pi^2 \rho W L f_{nom} d_o^4 \sigma_{ymin}}{3\varepsilon_o L_e V_P^2 (L_{s2} - L_{s1})} f_o \quad (22)$$

Again, the 4th power dependence on the gap $d_0$ implies a very high resolution sensor with small gaps. Using a typical Allan deviation value of $2\times 10^{-8}$ at a 1 s integration time measured for a wine-glass disk resonator fabricated in a similar process yields 0.246 nε resolution.

C. Range

The actuation gap height $d_0$ ultimately limits the maximum measurable compressive strain as follows $$\varepsilon_{max} = d_o/L_{s2} \quad (23)$$

Here, a nominal actuation gap value of 50 nm with a 20 um-long support arm limits the compressive strain measurement range to 2500με.

Although demonstrated via small-gapped micromechanical circuits, it should be clear that the sensitivity and resolution offered by this approach is applicable to larger gap devices, as well, since electrical stiffness is universal. As long as a dc-bias voltage applicable to the gap spacing is available, e.g., large dc-bias for a large gap, there is technically no limit to the designable measurement range.

From the description herein, it will be appreciated that that the present disclosure encompasses multiple embodiments which include, but are not limited to, the following:

1. A strain sensor, comprising: (a) a structure; (b) a support connected to the structure, the support attached to a substrate; (c) a capacitive-gap transducer adjacent to the structure; (d) wherein the capacitive-gap transducer adjacent to the structure comprises an area $A_{ov}$ in proximity to the structure; and (e) wherein, when the structure is driven, transmission between the structure and the capacitive-gap transducer may be measured.

2. The strain sensor any preceding or following embodiment, wherein the structure comprises: (a) a ring resonator; and (b) a support stem connecting a support spoke to the ring resonator, the support stem projecting from the substrate.

3. The strain sensor any preceding or following embodiment, wherein the capacitive-gap transducer forms a transducer gap with the ring resonator.

4. The strain sensor any preceding or following embodiment, further comprising: (a) an input port that drives the ring resonator by application of an input waveform $V_{drive}$ and a DC-bias voltage $V_p$; and (b) an analyzer applied to an output port, whereby transmission of the input waveform $V_{drive}$ is measured; (c) wherein either: (i) the input port electrically connects to the ring resonator, and the output port electrically connects to the capacitive-gap transducer; or (ii) the output port electrically connects to the ring resonator, and the input port electrically connects to the capacitive-gap transducer.

5. The strain sensor any preceding or following embodiment, wherein the analyzer comprises one or more devices selected from the group consisting of: a network analyzer, a spectrum analyzer, and a frequency counter.

6. The strain sensor any preceding or following embodiment, wherein a peak transmission of the ring resonator is determined using the analyzer.

7. The strain sensor any preceding or following embodiment, wherein the transducer gap between the capacitive-gap transducer and the ring resonator is determined by a curve fit of a series of measurements of the peak transmission of the ring resonator versus the DC-bias voltage $V_p$.

8. The strain sensor any preceding or following embodiment, wherein the capacitive-gap transducer is an inside capacitive-gap transducer disposed on an inside diameter of the ring resonator, wherein the transducer gap between the inside capacitive-gap transducer and the inside diameter of the ring resonator is separated by an inside gap $d_{in}$.

9. The strain sensor any preceding or following embodiment, wherein the capacitive-gap transducer is an outside capacitive-gap transducer disposed on an outside diameter of the ring resonator, wherein the transducer gap between the outside capacitive-gap transducer and the outside diameter of the ring resonator is separated by an outside gap $d_{out}$.

10. The strain sensor any preceding or following embodiment, wherein a residual strain ε is calculated by $$\varepsilon = \frac{d_{out} - d_{in}}{2R}$$

where R is an average radius of the inside and outside diameters of the ring resonator.

11. The strain sensor any preceding or following embodiment, wherein the transducer gap is not initially known.

12. The strain sensor any preceding or following embodiment, wherein the structure comprises: (a) a folded beam support attached to: (i) the substrate by at least one anchor at a first end; and (ii) a stress arm at a second end; and (b) a beam resonator attached to the stress arm opposite from the folded beam support.

13. The strain sensor any preceding or following embodiment, wherein the capacitive-gap transducer forms a gap $d_0$ with the beam resonator.

14. The strain sensor any preceding or following embodiment, further comprising: (a) an input port electrically connected to the beam resonator and an output port electrically connected to the capacitive-gap transducer; or (b) an output port electrically connected to the beam resonator and an input port electrically connected to the capacitive-gap transducer.

15. The strain sensor any preceding or following embodiment, wherein a peak transmission of the beam resonator is determined by measuring input port to output port transmission with the analyzer.

16. The strain sensor any preceding or following embodiment, wherein a resonance frequency of the beam resonator is determined by measuring input port to output port transmission with the analyzer.

17. The strain sensor any preceding or following embodiment, wherein the analyzer comprises one or more devices selected from the group consisting of: a network analyzer, a spectrum analyzer, and a frequency counter.

18. The strain sensor any preceding or following embodiment, wherein the gap $d_0$ between the capacitive-gap transducer and the beam resonator is determined by a curve fit of a series of measurements of the peak transmission of the beam resonator versus the DC-bias voltage $V_p$.

19. A beam strain sensor, comprising: (a) a first structure and a second structure, each said structure comprising: (i) a support connected to the structure, the support attached to a substrate; (ii) a capacitive-gap transducer adjacent to the structure; (iii) a folded beam support attached to: (1) the substrate by at least one anchor at a first end; and (2) a stress arm at a second end; and (3) a beam resonator attached to the stress arm opposite from the folded beam support; (iv) wherein the capacitive-gap transducer forms a gap $d_0$ with the beam resonator; (v) wherein each said structure is driven by applying a waveform $V_{drive}$ and a DC-bias voltage $V_p$ between the structure and the capacitive-gap transducer adjacent to the structure; and (vi) wherein transmission of the waveform $V_{drive}$ and DC-bias voltage $V_p$ through the gap $d_0$ is measured with an analyzer to form a spectral response; (vii) wherein a peak transmission in the spectral response can be determined; (viii) wherein the gap $d_0$ between the capacitive-gap transducer and the beam resonator is determined by a curve fit of a series of measurements of the peak transmission of the beam resonator versus the DC-bias voltage $V_p$; and (ix) wherein a change in frequency $\Delta f_s$ for a given range of DC-bias voltage $V_p$ can be determined; (b) wherein a strain ε is determined using the first and second structures by performing steps comprising: (i) providing a length $L_{s1}$ for the stress arm of the first structure; (ii) providing a length $L_{s2}$ for the stress arm of the second structure; (iii) determining the change in frequency $\Delta f_{s1}$ for the first structure; (iv) determining the change in frequency $\Delta f_{s2}$ for the second structure; and (v) calculating the strain c using the lengths $L_{s1}$ and $L_{s2}$ changes in frequencies $\Delta f_{s1}$ and $\Delta f_{s2}$.

20. The strain sensor any preceding or following embodiment, wherein the analyzer comprises one or more devices selected from the group consisting of: a network analyzer, a spectrum analyzer, and a frequency counter.

21. A beam strain sensing method, comprising: (a) providing a first structure and a second structure, each said structure comprising: (i) a support connected to the structure, the support attached to a substrate; (ii) a capacitive-gap transducer adjacent to the structure; (iii) a folded beam support attached to: (1) the substrate by at least one anchor at a first end; and (2) a stress arm at a second end; and (3) a beam resonator attached to the stress arm opposite from the folded beam support; (iv) wherein the capacitive-gap transducer forms a gap $d_0$ with the beam resonator; (v) wherein each said structure is driven by applying a waveform $V_{drive}$ and a DC-bias voltage $V_p$ between the structure and the capacitive-gap transducer adjacent to the structure; and (vi) wherein transmission of the waveform $V_{drive}$ and DC-bias voltage $V_p$ through the gap $d_0$ is measured with an analyzer to form a spectral response; (vii) wherein a peak transmission in the spectral response can be determined; (viii) wherein the gap $d_0$ between the capacitive-gap transducer and the beam resonator is determined by a curve fit of a series of measurements of the peak transmission of the beam resonator versus the DC-bias voltage $V_p$; and (ix) wherein a change in frequency $\Delta f_s$ for a given range of DC-bias voltage $V_p$ can be determined; (b) determining a strain c by performing steps comprising: (i) providing a length $L_{s1}$ for the stress arm of the first structure; (ii) providing a length $L_{s2}$ for the stress arm of the second structure; (iii) determining the change in frequency $\Delta f_{s1}$ for the first structure; (iv) determining the change in frequency $\Delta f_{s2}$ for the second structure; and (v) calculating the strain ε using the lengths $L_{s1}$ and $L_{s2}$ changes in frequencies $\Delta f_{s1}$ and $M_{s2}$.

22. The strain sensor any preceding or following embodiment, wherein the analyzer comprises one or more devices selected from the group consisting of: a network analyzer, a spectrum analyzer, and a frequency counter.

23. An electrical stiffness-based sensor, the sensor comprising a spoke-supported ring structure surrounded both inside and outside by balanced capacitive-gap transducers that pull its resonance frequency according to strain-induced changes in inside and outside electrode-to-resonator gap spacing.

24. The sensor any preceding or following embodiment, further comprising a spoke-supported doped polysilicon ring surrounded by matched inside and outside doped polysilicon electrodes.

25. The sensor any preceding or following embodiment, wherein when the electrode-to-resonator gaps are small, the resonance frequency of the ring structure becomes a strong function of electrical stiffness, which is in turn strongly dependent on gap spacing.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

As used herein, the terms "approximately", "approximate", "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Geometric Dimensions And Material Properties

| Parameter | Value | Parameter | Value |
|---|---|---|---|
| Inside Radius, $R_{in}$ | 17.4 μm | Outside Radius, $R_{out}$ | 11.5 μm |
| Inside Angle, $\theta_{in}$ | 65.26° | Outside Angle, $\theta_{out}$ | 43.13° |
| Inside Coeff., $\chi_{in}$ | 0.912 | Outside Coeff., $\chi_{out}$ | 1.075 |
| Thickness, H | 3 μm | Young's Table Modulus | 158 GPa |
| Ring Width, W | 5.9 μm | Density | 2300 kg/m$^3$ |
| Ring Radius, R | 14.45 μm | Poisson Ratio | 0.226 |

TABLE 2

Ring Resonator Performance Comparison
With State-Of-The-Art Strain Sensors

| Technology | MEMS Cap. | MEMS Piezo. | MEMS Res. | This Work | Unit |
|---|---|---|---|---|---|
| Scale Factor | 816 µV | 340 µV | 120 Hz | 292 Hz | $\mu\varepsilon^{-1}$ |
| Resolution | 870 | 28.7 | 4 | 9.19 | $n\varepsilon$ |
| Range | ±1000 | N/A | ±2.5 | ±2768 | $\mu\varepsilon$ |

TABLE 3

Beam Resonator Performance Comparison
With State-Of-The-Art Strain Sensors

| Technology | MEMS Cap. | MEMS Piezo. | MEMS Res. | This Work | Unit |
|---|---|---|---|---|---|
| Scale Factor | 816 µV | 340 µV | 120 Hz | 689 Hz | $\mu\varepsilon^{-1}$ |
| Resolution | 870 | 28.7 | 4 | 0.246 | $n\varepsilon$ |
| Range | ±1000 | N/A | ±2.5 | ±2500 | $\mu\varepsilon$ |

What is claimed is:

1. A strain sensor, comprising:
(a) a structure;
(b) a support connected to the structure, the support attached to a substrate;
(c) a capacitive-gap transducer adjacent to the structure;
(d) wherein the capacitive-gap transducer adjacent to the structure comprises an area $A_{ov}$ in proximity to the structure;
(e) wherein, when the structure is driven, transmission between the structure and the capacitive-gap transducer may be measured;
(f) wherein the structure comprises:
a ring resonator; and
a support stem connecting a support spoke to the ring resonator, the support stem projecting from the substrate;
(g) wherein the capacitive-gap transducer forms a transducer gap with the ring resonator;
(h) an input port that drives the ring resonator by application of an input waveform $V_{drive}$ and a DC-bias voltage $V_p$;
(i) an analyzer applied to an output port, whereby transmission of the input waveform $V_{drive}$ is measured;
(j) wherein either:
the input port electrically connects to the ring resonator, and the output port electrically connects to the capacitive-gap transducer; or
the output port electrically connects to the ring resonator, and the input port electrically connects to the capacitive-gap transducer;
(k) wherein the analyzer comprises one or more devices selected from the group consisting of: a network analyzer, a spectrum analyzer, and a frequency counter;
(l) wherein a peak transmission of the ring resonator is determined using the analyzer;
(m) wherein the transducer gap between the capacitive-gap transducer and the ring resonator is determined by a curve fit of a series of measurements of the peak transmission of the ring resonator versus the DC-bias voltage $V_p$.

2. The strain sensor of claim 1, wherein the capacitive-gap transducer is an inside capacitive-gap transducer disposed on an inside diameter of the ring resonator, wherein the transducer gap between the inside capacitive-gap transducer and the inside diameter of the ring resonator is separated by an inside gap $d_{in}$.

3. The strain sensor of claim 2, wherein the capacitive-gap transducer is an outside capacitive-gap transducer disposed on an outside diameter of the ring resonator, wherein the transducer gap between the outside capacitive-gap transducer and the outside diameter of the ring resonator is separated by an outside gap $d_{out}$.

4. The strain sensor of claim 3, wherein a residual strain ε is calculated by $$\varepsilon = \frac{d_{out} - d_{in}}{2R}$$

where R is an average radius of the inside and outside diameters of the ring resonator.

5. The strain sensor of claim 1, wherein the transducer gap is not initially known.

6. A strain sensor, comprising:
(a) a structure;
(b) a support connected to the structure, the support attached to a substrate;
(c) a capacitive-gap transducer adjacent to the structure;
(d) wherein the capacitive-gap transducer adjacent to the structure comprises an area in proximity to the structure;
(e) wherein, when the structure is driven, transmission between the structure and the capacitive-gap transducer may be measured;
(f) wherein the structure comprises:
a folded beam support attached to:
(i) the substrate by at least one anchor at a first end; and
(ii) a stress arm at a second end; and
a beam resonator attached to the stress arm opposite from the folded beam support.

7. The strain sensor of claim 6, wherein the capacitive-gap transducer forms a gap $d_0$ with the beam resonator.

8. The strain sensor of claim 7, further comprising:
(a) an input port electrically connected to the beam resonator and an output port electrically connected to the capacitive-gap transducer; or
(b) an output port electrically connected to the beam resonator and an input port electrically connected to the capacitive-gap transducer.

9. The strain sensor of claim 8, wherein a peak transmission of the beam resonator is determined by measuring input port to output port transmission with the analyzer.

10. The strain sensor of claim 9, wherein the analyzer comprises one or more devices selected from the group consisting of: a network analyzer, a spectrum analyzer, and a frequency counter.

11. The strain sensor of claim 10, wherein the gap $d_0$ between the capacitive-gap transducer and the beam resonator is determined by a curve fit of a series of measurements of the peak transmission of the beam resonator versus the DC-bias voltage $V_p$.

12. The strain sensor of claim 8, wherein a resonance frequency of the beam resonator is determined by measuring input port to output port transmission with the analyzer.

13. A beam strain sensor, comprising:
(a) a first structure and a second structure, each said structure comprising:
(i) a support connected to the structure, the support attached to a substrate;

(ii) a capacitive-gap transducer adjacent to the structure;
(iii) a folded beam support attached to:
  (1) the substrate by at least one anchor at a first end; and
  (2) a stress arm at a second end; and
  (3) a beam resonator attached to the stress arm opposite from the folded beam support;
(iv) wherein the capacitive-gap transducer forms a gap $d_0$ with the beam resonator;
(v) wherein each said structure is driven by applying a waveform $V_{drive}$ and a DC-bias voltage $V_p$ between the structure and the capacitive-gap transducer adjacent to the structure; and
(vi) wherein transmission of the waveform $V_{drive}$ and DC-bias voltage $V_p$ through the gap $d_0$ is measured with an analyzer to form a spectral response;
(vii) wherein a peak transmission in the spectral response can be determined;
(viii) wherein the gap $d_0$ between the capacitive-gap transducer and the beam resonator is determined by a curve fit of a series of measurements of the peak transmission of the beam resonator versus the DC-bias voltage $V_p$; and
(ix) wherein a change in frequency $\Delta f_s$ for a given range of DC-bias voltage $V_p$ can be determined;
(b) wherein a strain ε is determined using the first and second structures by performing steps comprising:
  (i) providing a length Ly for the stress arm of the first structure;
  (ii) providing a length L, for the stress arm of the second structure;
  (iii) determining the change in frequency $\Delta f_{s1}$ for the first structure;
  (iv) determining the change in frequency $\Delta f_{s2}$ for the second structure; and
  (v) calculating the strain ε using the lengths $L_{s1}$ and $L_{s2}$ and changes in frequencies $\Delta f_{s1}$ and $\Delta f_{s2}$.

14. The strain sensor of claim 13, wherein the analyzer comprises one or more devices selected from the group consisting of: a network analyzer, a spectrum analyzer, and a frequency counter.

15. A beam strain sensing method, comprising:
(a) providing a first structure and a second structure, each said structure comprising:
  (i) a support connected to the structure, the support attached to a substrate;
  (ii) a capacitive-gap transducer adjacent to the structure;
  (iii) a folded beam support attached to:
    (1) the substrate by at least one anchor at a first end; and
    (2) a stress arm at a second end; and
    (3) a beam resonator attached to the stress arm opposite from the folded beam support;
  (iv) wherein the capacitive-gap transducer forms a gap $d_0$ with the beam resonator;
  (v) wherein each said structure is driven by applying a waveform $V_{drive}$ and a DC-bias voltage $V_p$ between the structure and the capacitive-gap transducer adjacent to the structure; and
  (vi) wherein transmission of the waveform $V_{drive}$ and DC-bias voltage $V_p$ through the gap $d_0$ is measured with an analyzer to form a spectral response;
  (vii) wherein a peak transmission in the spectral response can be determined;
  (viii) wherein the gap $d_0$ between the capacitive-gap transducer and the beam resonator is determined by a curve fit of a series of measurements of the peak transmission of the beam resonator versus the DC-bias voltage $V_p$; and
  (ix) wherein a change in frequency $\Delta f$ for a given range of DC-bias voltage $V_p$ can be determined;
(b) determining a strain ε by performing steps comprising:
  (i) providing a length $L_{s1}$ for the stress arm of the first structure;
  (ii) providing a length $L_{s2}$ for the stress arm of the second structure;
  (iii) determining the change in frequency $\Delta f_{s1}$ for the first structure;
  (iv) determining the change in frequency $\Delta f_{s2}$ for the second structure; and
  (v) calculating the strain ε using the lengths $L_{s1}$ and $L_{s2}$ and changes in frequencies $\Delta f_{s1}$ and $\Delta f_{s2}$.

16. The strain sensor of claim 15, wherein the analyzer comprises one or more devices selected from the group consisting of: a network analyzer, a spectrum analyzer, and a frequency counter.

17. An electrical stiffness-based sensor, the sensor comprising a spoke-supported ring structure surrounded both inside and outside by balanced capacitive-gap transducers that pull its resonance frequency according to strain-induced changes in inside and outside electrode-to-resonator gap spacing.

18. The sensor of claim 17, wherein when the electrode-to-resonator gaps are small, the resonance frequency of the ring structure becomes a strong function of electrical stiffness, which is in turn strongly dependent on gap spacing.

19. The sensor of claim 17, further comprising a spoke-supported doped polysilicon ring surrounded by matched inside and outside doped polysilicon electrodes.

20. The sensor of claim 19, wherein when the electrode-to-resonator gaps are small, the resonance frequency of the ring structure becomes a strong function of electrical stiffness, which is in turn strongly dependent on gap spacing.

* * * * *